US012783015B2

(12) United States Patent
Xu et al.

(10) Patent No.: US 12,783,015 B2
(45) Date of Patent: Nov. 3, 2026

(54) TORQUE MODULE, ROTATING SHAFT ASSEMBLY, AND ELECTRONIC DEVICE

(71) Applicant: GUANGDONG OPPO MOBILE TELECOMMUNICATIONS CORP., LTD., Dongguan (CN)

(72) Inventors: Yaxing Xu, Dongguan (CN); Changchun Shi, Dongguan (CN); Yi Peng, Dongguan (CN); Hongdong Huang, Dongguan (CN); Qiuliang Chen, Dongguan (CN); Zihao Liang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 180 days.

(21) Appl. No.: 18/759,761

(22) Filed: Jun. 28, 2024

(65) Prior Publication Data

US 2024/0370064 A1 Nov. 7, 2024

Related U.S. Application Data

(63) Continuation of application No. PCT/CN2022/127111, filed on Oct. 24, 2022.

(30) Foreign Application Priority Data

Dec. 30, 2021 (CN) ......................... 202111680584.8

(51) Int. Cl.

| | |
|---|---|
| ***E05F 1/08*** | (2006.01) |
| ***F16C 11/04*** | (2006.01) |
| ***G06F 1/16*** | (2006.01) |

(52) U.S. Cl.

CPC ............ *G06F 1/1681* (2013.01); *F16C 11/04* (2013.01); *G06F 1/1618* (2013.01)

(58) Field of Classification Search

CPC .... G06F 1/1681; G06F 1/1616; G06F 1/1618; G06F 1/1679; H05K 5/0226;

(Continued)

(56) References Cited

U.S. PATENT DOCUMENTS

| | | | | |
|---|---|---|---|---|
| 6,862,779 B1 * | 3/2005 | Lu | .......................... | G06F 1/1616 16/337 |
| 8,424,163 B2 * | 4/2013 | Ahn | .................... | H04M 1/0216 16/303 |

(Continued)

FOREIGN PATENT DOCUMENTS

| | | |
|---|---|---|
| CN | 1969133 A | 5/2007 |
| CN | 101201078 A | 6/2008 |

(Continued)

OTHER PUBLICATIONS

Second Office Action in Chinese patent Application No. 202111680584.8, mailed Nov. 11, 2025.

(Continued)

*Primary Examiner* — Chuck Y Mah

(74) *Attorney, Agent, or Firm* — Ladas & Parry, LLP

(57) ABSTRACT

A torque module, a rotating shaft assembly, and an electronic device. The torque module includes a rotating shaft, a first blocking member, a second blocking member, a rotating assembly, a sliding assembly, and a first elastic member. The rotating assembly is sleeved on the rotating shaft and disposed between the first blocking member and the second blocking member, and the rotating assembly is arranged with a first mating portion. The sliding assembly includes a first sliding member sleeved on the rotating shaft, and the first sliding member is arranged with a second mating portion. The first elastic member is sleeved on the rotating shaft and disposed between the rotating assembly and the second blocking member. When the sliding assembly slides away from the rotating assembly, the first elastic member is (Continued)

compressed and the rotating assembly remains stationary relative to the sliding assembly when the rotating assembly stops rotating.

18 Claims, 7 Drawing Sheets

(58) Field of Classification Search
CPC ........... H04M 1/0216; E05Y 2900/606; E05Y 2201/422; E05Y 2201/638; E05Y 2201/454; E05Y 2201/456; E05D 11/1042; E05D 11/087; E05D 11/08; E05D 11/082; E05D 11/084; E05D 11/085; E05D 3/02; F16C 11/00; F16C 11/12; F16M 11/38; E05F 1/1033; E05F 1/1207; E05F 1/1223; E06F 1/1626; E06F 1/1681
See application file for complete search history.

(56) References Cited

U.S. PATENT DOCUMENTS

| | | | | |
|---|---|---|---|---|
| 9,535,465 | B2 * | 1/2017 | Bohn | H04M 1/022 |
| 2007/0136992 | A1 * | 6/2007 | Lu | E05D 11/1078 16/330 |
| 2010/0218343 | A1 * | 9/2010 | Cheng | G06F 1/1624 16/303 |
| 2011/0088219 | A1 * | 4/2011 | Huang | G06F 1/1681 16/319 |
| 2014/0192471 | A1 * | 7/2014 | Chang | G06F 1/1633 361/679.26 |
| 2016/0034004 | A1 * | 2/2016 | Park | E05D 11/1078 16/366 |
| 2021/0081007 | A1 * | 3/2021 | Jan | G06F 1/1681 |
| 2021/0165466 | A1 | 6/2021 | Kang et al. | |
| 2023/0304530 | A1 * | 9/2023 | Yu | H04M 1/022 |
| 2024/0248519 | A1 * | 7/2024 | Zhan | G09F 9/301 |
| 2024/0259485 | A1 * | 8/2024 | Kang | G06F 1/1616 |

FOREIGN PATENT DOCUMENTS

| | | | | |
|---|---|---|---|---|
| CN | 102454687 | B * | 2/2014 | G06F 1/1681 |
| CN | 108266080 | A | 7/2018 | |
| CN | 110611726 | A | 12/2019 | |
| CN | 112995368 | A | 6/2021 | |
| CN | 113202857 | A | 8/2021 | |
| CN | 113507533 | A | 10/2021 | |
| CN | 113719525 | A | 11/2021 | |
| CN | 114135567 | A | 3/2022 | |
| CN | 115163655 | A | 10/2022 | |
| JP | 2003239941 | A | 8/2003 | |
| WO | 2020186889 | A1 | 9/2020 | |
| WO | 2021115462 | A1 | 6/2021 | |
| WO | 2021129882 | A1 | 7/2021 | |

OTHER PUBLICATIONS

International Search Report, International Application No. PCT/CN2022/127111, mailed Jan. 19, 2023.
Written Opinion of the International Searching Authority in International Application No. PCT/CN2022/127111, mailed Jan. 19, 2023 with English translation provided by applicant's foreign counsel and by WIPO.
Office action and search report in Chinese patent Application No. 202111680584.8, mailed Jul. 26, 2025.
Chinese Rejection decision from corresponding Chinese patent Application No. 202111680584.8, mailed Feb. 3, 2026.
European Search Report from corresponding European patent Application No. 26155079.2, mailed Apr. 16, 2026.
Chinese Third Office Action, corresponding Chinese patent Application No. 202111680584.8, mailed Jun. 2, 2026 with search report (17 pages).
Chinese Fourth Office Action, corresponding Chinese patent Application No. 202111680584.8, mailed Jul. 24, 2026 with search report (15 pages).

* cited by examiner

TORQUE MODULE, ROTATING SHAFT ASSEMBLY, AND ELECTRONIC DEVICE

CROSS-REFERENCE TO RELATED APPLICATIONS

The present application is a continuation-application of International (PCT) Patent Application No. PCT/CN2022/127111, filed on Oct. 24, 2022, which claims priority to Chinese Patent Application No. 202111680584.8, filed on Dec. 30, 2021, the entire contents of which are hereby incorporated by reference in their entireties.

TECHNICAL FIELD

The present disclosure relates to the technical field of mechanical components, and in particular to a torque module, a rotating shaft assembly, and an electronic device.

BACKGROUND

In the field of mechanical components, torque modules are often applied in a variety of structures, such as door locks and electronic devices, to achieve hovering. However, conventional torque modules have poor friction performance, poor hovering effect, and large structure size.

SUMMARY OF THE DISCLOSURE

In a first aspect, the present disclosure provides a torque module, including:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, including a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein a rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating.

In a second aspect, the present disclosure provides a rotating shaft assembly, including two the torque modules, as in the first aspect, that are disposed axially symmetrically; the rotating assembly in one of the two torque modules extends in a direction away from the rotating assembly in the other of the two torque modules.

In a third aspect, the present disclosure provides an electronic device, including two housings, a flexible screen, and the rotating shaft assembly as in the second aspect; wherein one of the two housings is at least partially disposed on an end of the rotating shaft assembly, and the other of the two housings is at least partially disposed on another end of the rotating shaft assembly; the two housings are connected to the rotating assemblies in the rotating shaft assembly; the flexible screen is disposed on a side of the two housings and the rotating assemblies.

BRIEF DESCRIPTION OF THE DRAWINGS

In order to more clearly illustrate the technical solutions in the embodiments of the present disclosure, the accompanying drawings, which are required to be used in the embodiments of the present disclosure, will be described below.

Figure 1:
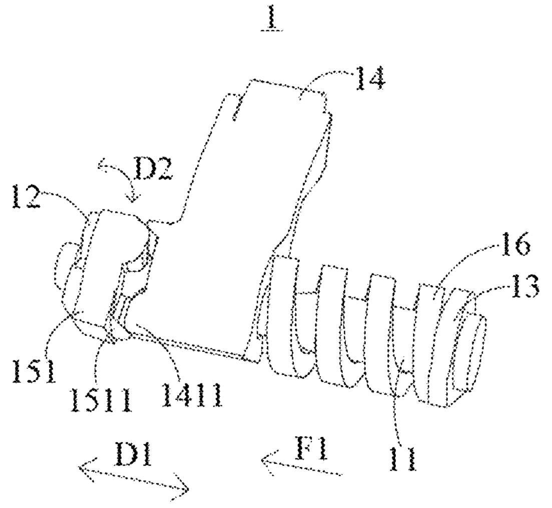
FIG. 1 is a perspective structural schematic view of a torque module according to some embodiments of the present disclosure.

REFERENCE NUMERALS torque module—1, rotating shaft—11, first portion—111, second portion—112, first blocking member—12, second blocking member—13, rotating assembly—14, first rotating member—141, first mating portion—1411, first protrusion—1411*a*, second rotating member—142, third mating portion—1421, third protrusion—1421*a*, connecting member—143, bracket—144, friction surface—145, limiting member—146, sliding assembly—15, first sliding member—151, second mating portion—1511, second protrusion—1511*a*, second sliding member—152, fourth mating pinortion—1521, fourth protrusion—1521*a*, first elastic member—16, friction member—17, second elastic member—18, positioning member—181, transmission portion—19, synchronization assembly—191, synchronization shaft—192, wear—resistant member—193, third blocking member—194, rotating shaft assembly—2, electronic device—3, housing—31, flexible screen—32.

DETAILED DESCRIPTION

The following is some embodiments of the present disclosure, and it should be noted that for those skilled in the art, a number of improvements and embellishments can be made without departing from the principles of the present disclosure, which are also regarded as within the scope of the present disclosure.

The present disclosure provides a torque module including:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, including a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein a rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating.

In some embodiments, a portion of the rotating assembly sleeved on the rotating shaft is arranged with a third mating portion on a side near the second blocking member;

the sliding assembly further includes a second sliding member sleeved on the rotating shaft and disposed on a side of the rotating assembly near the second blocking member, and a portion of the second sliding member sleeved on the rotating shaft is arranged with a fourth mating portion on a side near the third mating portion;

the rotation of the rotating assembly further enables the third mating portion and the fourth mating portion to cooperate with each other, and the sliding assembly is caused to slide in the direction close to or away from the rotating assembly; in condition of the sliding assembly sliding in the direction away from the rotating assembly, the first elastic member is in the compressed state and the third mating portion and the fourth mating portion abut against each other, and the rotating assembly is caused to remain stationary relative to the sliding assembly in condition of the rotating assembly stopping rotating.

In some embodiments, the first mating portion includes a plurality of first protrusions spaced apart, the second mating portion includes a plurality of second protrusions spaced apart, the third mating portion includes a plurality of third protrusions spaced apart, and the fourth mating portion includes a plurality of fourth protrusions spaced apart; each of the plurality of first protrusions, the plurality of second protrusions, the plurality of third protrusions, and the plurality of fourth protrusions has a crest; the crests of the plurality of first protrusions are disposed symmetrically with the crests of the plurality of third protrusions, and the crests of the plurality of second protrusions are disposed symmetrically with the crests of the plurality of fourth protrusions;

in condition of the sliding assembly sliding in the direction away from the rotating assembly, and the crests of the plurality of first protrusions being in contact with the crests of the plurality of second protrusions and the crests of the plurality of third protrusions being in contact with the crests of the plurality of fourth protrusions, the first elastic member is in the compressed state, and the sliding assembly is caused to abut against the rotating assembly.

In some embodiments, the rotating assembly includes:

a first rotating member, sleeved on the rotating shaft and disposed on a side near the first sliding member; wherein a side of the first rotating member near the first sliding member is arranged with the first mating portion;

a second rotating member, sleeved on the rotating shaft and disposed on a side near the second sliding member; wherein a side of the second rotating member near the second sliding member is arranged with the third mating portion;

a connecting member; wherein an end of the connecting member is connected to the first rotating member, and another end of the connecting member is connected to the second rotating member; and a bracket, sleeved on the rotating shaft 11 and disposed between the first rotating member and the second rotating member.

In some embodiments, an abutting position between the first rotating member in the rotating assembly and the bracket is arranged with a friction surface; and/or an abutting position between the second rotating member in the rotating assembly and the bracket is arranged with a friction surface.

In some embodiments, the first rotating member is sleeved on the end of the connecting member, and the second rotating member is sleeved on the other end of the connecting member; the torque module further includes two limiting members, wherein an end of the connecting member is connected to one of the two limiting members, and the other end of the connecting member is connected to the other of the two limiting members; one of the two limiting members is fixed to an end of the first rotating member back from the second rotating member, and the other of the two limiting members is fixed to an end of the second rotating member back from the first rotating member.

In some embodiments, a side of each limiting member near the rotating assembly is arranged with a first snap portion, and a second snap portion is arranged on a side of the rotating assembly near the first snap portion, with at least a portion of the first snap portion being arranged within the second snap portion.

In some embodiments, the torque module further includes a friction member, fixed to the rotating shaft and disposed on a side of the second blocking member back from the rotating assembly; wherein the rotation of the rotating assembly enables the friction member to rotate relative to the second blocking member.

In some embodiments, the rotating shaft includes a first portion and a second portion connected to the first portion; the first portion penetrates the first blocking member, the sliding assembly, the rotating assembly, and at least a portion of the first elastic member; the second portion penetrates the second blocking member and at least a portion of the first elastic member; a radial dimension of each of the sliding assembly and the rotating assembly is the same as or smaller than a radial dimension of the second portion.

In some embodiments, the first elastic member has a pre-compressed state.

The present disclosure further provides a rotating shaft assembly, including two torque modules that are disposed axially symmetrically; wherein for each of the two torque modules, the torque module includes:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, including a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein a rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating;

the rotating assembly in one of the two torque modules extends in a direction away from the rotating assembly in the other of the two torque modules.

In some embodiments, the sliding assembly further includes a second sliding member sleeved on the rotating shaft and disposed on a side of the rotating assembly near the second blocking member; the second sliding members in the two torque modules are connected to each other, and the second blocking members in the two torque modules are connected to each other; the rotating shaft assembly further includes a second elastic member disposed between a connection of the second sliding members and a connection of the second blocking members.

In some embodiments, the second elastic member has a pre-compressed state.

In some embodiments, the torque module further includes a positioning member disposed between the second sliding members and the second blocking members, and the positioning member is connected to the connection of the second sliding members or the connection of the second blocking members; the second elastic member is sleeved on the positioning member; a first end of the second elastic member is in contact with the connection of the second sliding members, and a second end of the second elastic member is in contact with the connection of the second blocking members, the first end being opposite to the second end.

In some embodiments, the first sliding members in the two torque modules are connected to each other, and the first blocking members in the two torque modules are connected to each other.

In some embodiments, brackets in the rotating assemblies of the two torque modules are connected to each other.

In some embodiments, a peripheral side of the portion of the rotating assembly sleeved on the rotating shaft is further arranged with a transmission portion, and the rotating assembly further includes a synchronization assembly; an end of the synchronization assembly is rotatably connected to the transmission portion, and another end of the synchronization assembly is rotatably connected to the transmission portion of the other of the two torque modules; the two torque modules are capable of moving synchronously.

In some embodiments, the rotating assembly further includes a bracket sleeved on the rotating shaft and disposed on a side of the transmission portion back from the sliding assembly, and the rotating shaft assembly further includes a synchronization shaft and a wear-resistant member; the synchronization shaft extends through the synchronization assembly and is connected to the bracket, and the wear-resistant member is fixed to a side of the synchronization assembly back from the bracket.

In some embodiments, the rotating shaft assembly further includes a third blocking member disposed on a side of the wear-resistant member back from the synchronization assembly.

The present disclosure further provides an electronic device, including two housings, a flexible screen, and a rotating shaft assembly; wherein one of the two housings is at least partially disposed on an end of the rotating shaft assembly, and the other of the two housings is at least partially disposed on another end of the rotating shaft assembly;

wherein the rotating shaft assembly includes two torque modules that are disposed axially symmetrically; for each of the two torque modules, the torque module includes:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, including a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein a rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating;

the rotating assembly in one of the two torque modules extends in a direction away from the rotating assembly in the other of the two torque modules;

the two housings are connected to the rotating assemblies in the rotating shaft assembly; the flexible screen is disposed on a side of the two housings and the rotating assemblies.

The following is some embodiments of the present disclosure, and it should be noted that for those skilled in the art, a number of improvements and embellishments can be made without departing from the principles of the present disclosure, which are also regarded as within the scope of the present disclosure.

Before introducing the technical solution of the present disclosure, the technical problems in the related art are described in detail.

In the field of mechanical components, torque modules are often applied in a variety of structures, such as door locks and electronic devices, to achieve hovering. However, conventional torque modules have poor friction performance, poor hovering effect, and large structure size. For example, when a torque module is applied in a U-shaped foldable mobile phone, the foldable mobile phone typically requires the torque module to provide a friction force greater than a predetermined force to achieve hovering. However, due to the need to ensure that the external force provided is greater than the predetermined force to realize the hovering, the size of the components in the torque module is large, such as cams, rotating shafts, rotating members, and the like of the torque module in the related art, resulting in a large overall structural size of the torque module. More specifically, in the related art, specialized torque assemblies that include a cam fit are mostly adopted. However, simulations and calculations show that using the cam alone to achieve the hovering function requires the size of the cam to meet the torque requirements, resulting in a larger overall size of the torque module, which results in the torque module being required to take up more internal space of the mobile phone. In this way, the size of other components in the mobile phone are limited, which reduces the performance of the mobile phone. For example, when the size of the battery of the mobile phone is limited, the amount of electrical energy stored in the mobile phone is reduced, which leads to a reduction in the endurance of the mobile phone.

Figure 2:
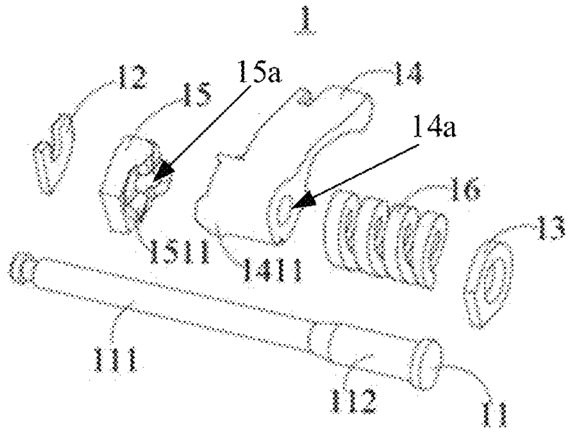
FIG. 2 is an exploded view of FIG. 1 according to some embodiments of the present disclosure.

In view of the above, in order to solve the above problems, the present disclosure provides a torque module. Referring to FIGS. 1-FIG. 2 together, FIG. 1 is a perspective structural schematic view of a torque module according to some embodiments of the present disclosure, and FIG. 2 is an exploded view of FIG. 1 according to some embodiments of the present disclosure.

The present embodiments provide a torque module 1 including a rotating shaft 11, a first blocking member 12, a second blocking member 13, a rotating assembly 14, a sliding assembly 15, and a first elastic member 16. The first blocking member 12 is fixed to the rotating shaft 11. The second blocking member 13 is fixed to the rotating shaft 11. The rotating assembly 14 is sleeved on the rotating shaft 11 and disposed between the first blocking member 12 and the second blocking member 13, and a portion of the rotating assembly 14 sleeved on the rotating shaft 11 is arranged with a first mating portion 1411 on a side near the first blocking member 12. The sliding assembly 15 includes a first sliding member 151 sleeved on the rotating shaft 11 on the side of the rotating assembly 14 near the first blocking member 12, a portion of the first sliding member 151 sleeved on the rotating shaft 11 is arranged with a second mating portion 1511 on a side near the first mating portion 1411. The first elastic member 16 is sleeved on the rotating shaft 11 and is disposed between the rotating assembly 14 and the second blocking member 13. A rotation of the rotating assembly 14 enables the first mating portion 1411 and the second mating portion 1511 to cooperate with each other, causing the sliding assembly 15 to slide in a direction close to or away from the rotating assembly 14. When the sliding assembly 15 slides in a direction away from the rotating assembly 14, the first elastic member 16 is in a compressed state and the first mating portion 1411 and the second mating portion 1511 abut against each other such that the rotating assembly 14 remains stationary relative to the sliding assembly 15 when the rotating assembly 14 stops rotating.

In addition, the terms "including" and "having" and any variations thereof are intended to cover non-exclusive inclusion. The terms "first", "second", etc. in the specification and claims of the present disclosure and in the above-described drawings are intended to distinguish between different objects and are not to describe a particular order.

The torque module 1 provided in the embodiments is a structure in which the rotating assembly 14, the sliding assembly 15, and the first elastic member 16 cooperate with each other, thereby realizing hovering and self-tightening. It is understood that the rotating assembly 14 can be stationary relative to the sliding assembly 15. Moreover, the torque module 1 provided in the embodiments can further cooperate with a wide variety of components to drive other components to realize the hovering and self-tightening. The present embodiments are illustrated schematically only with the torque module 1 applied to an electronic device. The electronic device provided in the embodiments includes, but is not limited to, a mobile phone, a tablet computer, a laptop computer, a handheld computer, a personal computer (PC), a personal digital assistant (PDA), a portable media player (PMP), a navigation device, a wearable device, a smart bracelet, a pedometer, and other mobile terminals, as well as fixed terminals such as a digital TV and a desktop computer. The present embodiments do not limit the types of the electronic device. However, it does not mean that the torque module 1 of the present embodiments must be applied to an electronic device. In other embodiments, the torque module 1 may be applied in other fields, such as the field of door locks, vehicles, etc.

The torque module 1 includes the rotating shaft 11, where the rotating shaft 11 is typically configured to enable other components to be sleeved on the rotating shaft 11 to realize the assembly of the components, so as to make the components fit together and to provide a basis for subsequent rotation and sliding. The first blocking member 12, the sliding assembly 15, the rotating assembly 14, the first elastic member 16, and the second blocking member 13 are all sleeved on the rotating shaft 11, i.e., the rotating shaft 11 extends through the first blocking member 12, the sliding assembly 15, the rotating assembly 14, the first elastic member 16, and the second blocking member 13. The material of the rotating shaft 11 includes, but is not limited to, plastics, metals, etc., and the present embodiments do not limit the shape of the rotating shaft 11. The rotating shaft 11 may be of any shapes, as long as the rotating shaft 11 passes through the first blocking member 12, the sliding assembly 15, the rotating assembly 14, the first elastic member 16, and the second blocking member 13.

In some embodiments, the rotating shaft 11 includes a first portion 111, and a second portion 112 connected to the first portion 111, the first portion 111 penetrating the first blocking member 12, the sliding assembly 15, the rotating assembly 14, and at least a portion of the first elastic member 16, the second portion 112 penetrating at least a portion of the first elastic member 16 and the second blocking member 13. The sliding assembly 15 defines a first through hole **15*a* through which the first portion 111 passes, and the rotating assembly 14 defines a second through hole 14*a* through which the first portion 111 passes. A radial dimension of each of the first through hole 15*a* and the second through hole 14*a* is not larger than a radial dimension of the second portion 112. Since the radial dimension of the first through hole 15*a* and the second through hole 14*a* is not larger than the radial dimension of the second portion 112, and the sliding assembly 15 and the rotating assembly 14 are sleeved on the first portion 111, the radial dimension of the first portion 111 is not larger than the radial dimension of the second portion 112. By setting the radial dimensions of the components, the axial movement of the sliding assembly 15 and the rotating assembly 14 relative to the rotating shaft 11 can be limited, such that the sliding assembly 15 and the rotating assembly 14 can be directed away from the first blocking member 12 when the first elastic member 16 is extruded. Further, the sliding range of the sliding assembly 15 and the rotating assembly 14 in an axial direction of the rotating shaft 11 can be limited to avoid excessive extrusion of the first elastic member 16, thereby improving the stability performance of the movement of the torque module 1 and improving the service life of the torque module 1**.

The torque module 1 provided in the embodiments includes the first blocking member 12, where the first blocking member 12 is typically configured to limit the movement of other components. In some embodiments, the first blocking member 12 may include a protrusion around a periphery of the rotating shaft 11, or may be a separate component mounted to the rotating shaft 11. The first blocking member 12 is sleeved on the rotating shaft 11, and it may be understood that the first blocking member 12 has a through hole through which the rotating shaft 11 passes, such that the first blocking member 12 is connected to the rotating shaft 11. In some embodiments, the first blocking member 12 is fixed to the rotating shaft 11 in ways that include, but are not limited to, a fixed connection, a snap connection, an interference fit, etc. The material of the first blocking member 12 includes, but is not limited to, plastic, metal, etc., and the present embodiments do not limit the shape of the first blocking member 12. The first blocking member 12 may be of any shapes, as long as the first blocking member 12 can limit the axial sliding of the sliding assembly 15 relative to the rotating shaft 11. In some embodiments, the first blocking member 12 may be a spacer.

The torque module 1 provided in the embodiments includes the second blocking member 13, where the second blocking member 13 is typically also configured to limit the movement of other components. In some embodiments, the second blocking member 13 may include a protrusion around the periphery of the rotating shaft 11, or may be a separate component mounted to the rotating shaft 11. The second blocking member 13 is sleeved on the rotating shaft 11, and it may be understood that the second blocking member 13 has a through hole through which the rotating shaft 11 passes, such that the second blocking member 13 is connected to the rotating shaft 11. In some embodiments, the second blocking member 13 is fixed to the rotating shaft 11 in ways that include, but are not limited to, a fixed connection, a snap connection, an interference fit, etc. The material of the second blocking member 13 includes, but is not limited to, plastic, metal, etc., and the present embodiments do not limit the shape of the second blocking member 13. The second blocking member 13 may be of any shapes, as long as the second blocking member 13 can limit the axial sliding of the first elastic member 16 relative to the rotating shaft 11. In some embodiments, the second blocking member 13 may be a spacer.

The first blocking member 12 and the second blocking member 13 are disposed at different positions relative to the rotating shaft 11, and thus the first blocking member 12 and the second blocking member 13 limit different components. In the present embodiments, sliding of the sliding assembly 15 in a direction close to the first blocking member 12 is limited by providing the first blocking member 12 on a side of the rotating member, and similarly sliding of the first elastic member 16 in a direction close to the second blocking member 13 is limited by providing the second blocking member 13 on a side of the first elastic member 16. The first blocking member 12 and the second blocking member 13 are arranged on both ends of the sliding assembly 15, the rotating assembly 14, and the first elastic member 16, respectively, such that the first blocking member 12 and the second blocking member 13 can limit the sliding range of the sliding assembly 15, the rotating assembly 14, and the first elastic member 16, causing them to slide only between the first blocking member 12 and the second blocking member 13.

The torque module 1 provided in the embodiments includes the rotating assembly 14, where the rotating assembly 14 is typically configured to perform rotation and may further be configured to cooperate with other components to synchronize the rotation of the other components. Moreover, the rotating assembly 14 may further cooperate with other components on the rotating shaft 11, such as the sliding assembly 15, i.e. the rotating assembly 14 may rotate relative to the sliding assembly 15. The rotating assembly 14 is arranged with the first mating portion 1411, and it should be noted that in actual production, the rotating assembly 14 and the first mating portion 1411 may be in a one-piece structure, and the rotating assembly 14 and the first mating portion 1411 are artificially named differently for ease of understanding. The material of the rotating assembly 14 includes, but is not limited to, plastic, metal, etc., and the present embodiment does not limit the shape of the rotating assembly 14. The rotating assembly 14 may be of any shapes, as long as the rotating assembly 14 is arranged with the first mating portion 1411. Moreover, the present disclosure does not limit the shape of the first mating portion 1411, as long as the first mating portion 1411 and the second mating portion 1511 can cooperate with each other. The first mating portion 1411 is arranged on a portion of the rotating assembly 14 that is sleeved on the rotating shaft 11, i.e., the first mating portion 1411 corresponds to an outer peripheral edge of the rotating shaft 11, so as to enable the rotating assembly 14 to cooperate with the other components when rotating to any angle. It can be understood that the first mating portion 1411 has a through hole through which the rotating shaft 11 passes. The structure of the first mating portion 1411 will be described in detail below.

The torque module 1 provided in the embodiments further includes the sliding assembly 15, where the sliding assembly 15 is a component axially slidable relative to the rotating shaft 11. The sliding assembly 15 includes the first sliding member 151 sleeved on the rotating shaft 11, and the first sliding member 151 is axially slidable relative to the rotating shaft 11. The first sliding member 151 is arranged with the second mating portion 1511, and it should be noted that in actual production, the first sliding member 151 and the second mating portion 1511 may be in a one-piece structure, and the first sliding member 151 and the second mating portion 1511 are artificially named differently for ease of understanding. The material of the first sliding member 151 includes, but is not limited to, plastic, metal, etc., and the present embodiments do not limit the shape of the first sliding member 151. The first sliding member 151 may be of any shapes, as long as the first sliding member 151 is arranged with the second mating portion 1511. Moreover, the present disclosure does not limit the shape of the second mating portion 1511, as long as the first mating portion 1411 and the second mating portion 1511 can cooperate with each other. The second mating portion 1511 is arranged on a portion of the first sliding member 151 that is sleeved on the rotating shaft 11, such that the second mating portion 1511 can also slide relative to the rotating shaft 11. It can be understood that the second mating portion 1511 has a through hole through which the rotating shaft 11 passes. Regarding the structure of the second mating portion 1511, and the specific manner in which the first mating portion 1411 and the second mating portion 1511 fit together, the present disclosure will be described in detail below.

In addition, when the rotating assembly 14 rotates relative to the sliding assembly 15, the sliding assembly 15 or the rotating assembly 14 is caused to slide relative to the rotating shaft 11. In some embodiments, when the rotating assembly 14 rotates, it is specifically that the rotating assembly 14 rotates in a peripheral direction of the rotating shaft 11. That is, when the rotating assembly 14 rotates, the rotating shaft 11 is in a stationary state, in which case the sliding assembly 15 is relatively at a standstill in the peripheral direction of the rotating shaft 11 and is relatively slidable only in the axial direction of the rotating shaft 11, i.e., the sliding assembly 15 cannot rotate relative to the rotating shaft 11 and is only slidable relative to the rotating shaft 11. The rotating assembly 14 is also relatively slidable in the axial direction of the rotating shaft 11. Regarding the specific cooperation process between the rotating assembly 14 and the sliding assembly 15, the present disclosure will be described in detail below.

The torque module 1 provided in the embodiments further includes the first elastic member 16, where the first elastic member 16 is disposed between the rotating assembly 14 and the second blocking member 13. In some embodiments, the first elastic member 16 may or may not be in contact with the rotating assembly 14 and the second blocking member 13, as long as the first elastic member 16 can be connected to the rotating assembly 14 and the second blocking member 13 and in a compressed state when the rotating assembly 14 slides relative to the rotating shaft 11. In some embodiments, the first elastic member 16 is connected to the rotating assembly 14 and the second blocking member 13 in a manner including, but not limited to, an abutting connection, a fixed connection, a detachable connection, an adhesive bonding, etc. The first elastic member 16 may be a coil spring, a volute spring, a leaf spring, a disk spring, etc.

In addition, the first blocking member 12, the sliding assembly 15, the rotating assembly 14, the first elastic member 16, and the second blocking member 13 may be sleeved on the rotating shaft 11 to realize assembly and provide a basis for subsequent rotation and sliding. It can be understood that the first blocking member 12, the sliding assembly 15, the rotating assembly 14, the first elastic member 16, and the second blocking member 13 each define a corresponding through hole, and the rotating shaft 11 passes through the corresponding through holes.

As can be seen from the foregoing, when the first mating portion 1411 and the second mating portion 1511 cooperate with each other, the rotation of the rotating assembly 14 relative to the sliding assembly 15 can be converted into the sliding of the rotating assembly 14 relative to the rotating shaft 11. When the sliding assembly 15 slides relative to the rotating shaft 11 in a direction away from the rotating assembly 14, i.e., when the rotating assembly 14 slides in a direction close to or away from the sliding assembly 15, the first elastic member 16 can be connected to the rotating assembly 14 and the second blocking member 13 due to the provision of the second blocking member 13 on an end of the first elastic member 16 which limits the sliding range of the first elastic member 16. Further, the rotating assembly 14 compresses the first elastic member 16, such that the first elastic member 16 is in a compressed state.

It is further noted that the first elastic member 16 can be in the compressed state when the rotating assembly 14 slides in a direction close to or away from the sliding assembly 15. However, when the rotating assembly 14 is not rotating relative to the sliding assembly 15, i.e., the first elastic member 16 is in an initial state, the present embodiments do not limit the initial state of the first elastic member 16, and the initial state of the first elastic member 16 includes, but is not limited to, a tensile state, an equilibrium state, or a state already in compression.

In other embodiments, the first elastic member 16 has a pre-compressed state. The first elastic member 16 is already in a compressed state when the first mating portion 1411 is not in cooperation with the second mating portion 1511, i.e., the rotating assembly 14 is not sliding in a direction close to or away from the sliding assembly 15. The first elastic member 16 having the pre-compressed state can compensate for the axial movement of the first elastic member 16 relative to the rotating shaft 11. It can be understood that when the torque module 1 is used for a certain period of time, even if the dimensions of the first elastic member 16 change or the structure of the first elastic member 16 loosens, the first elastic member 16 having the pre-compressed state can compensate for the axial movement of the first elastic member 16 relative to the rotating shaft 11, thereby improving the stability of the torque module 1 and ensuring long-term consistency of the torque feel of the torque module 1.

As shown in FIG. 1, by providing the first mating portion 1411 on the rotating assembly 14, the second mating portion 1511 on the first sliding member 151 of the sliding assembly 15, and the first elastic member 16, through the cooperation of the three, when the rotating assembly 14 rotates relative to the sliding assembly 15 (as shown in the direction of D2 in FIG. 1), the first mating portion 1411 and the second mating portion 1511 can cooperate with each other to cause the sliding assembly 15 to slide in a direction close to or away from the rotating assembly 14 (as shown in the D1 direction in FIG. 1), such that the rotating assembly 14 slides in a direction close to or away from the first sliding member 151. It can be understood that when the rotating assembly 14 rotates relative to the sliding assembly 15, the first mating portion 1411 also rotates relative to the second mating portion 1511, and since the first mating portion 1411 and the second mating portion 1511 can cooperate with each other, the rotating assembly 14 slides in the direction close to or away from the sliding assembly 15.

Moreover, when the sliding assembly 15 slides in the direction D1 close to or away from the rotating assembly 14, the rotating assembly 14 contacts and compresses the first elastic member 16. Depending on the reference, the above mentioned "the sliding assembly 15 slides in the direction D1 close to or away from the rotating assembly 14" may be understood as the rotating assembly 15 being axially stationary relative to the rotating shaft 11 and the rotating assembly 14 sliding axially relative to the rotating shaft 11; or, the sliding assembly 15 sliding axially relative to the rotating shaft 11 and the rotating assembly 14 being axially stationary relative to the rotating shaft 11. Both of these options ultimately result in the rotating assembly coming into contact with and compressing the first elastic member, but specifically the movement process is different. For example, when the sliding assembly 15 is axially stationary relative to the rotating shaft 11 and the rotating assembly 14 is axially sliding relative to the rotating shaft 11, the rotating assembly 14 moves in a direction close to or away from the first elastic member 16 to compress the first elastic member 16. Alternatively, when the sliding assembly 15 is axially sliding relative to the rotating shaft 11 and the rotating assembly 14 is axially stationary relative to the rotating shaft 11, the sliding assembly 15 drives the rotating shaft 11 to move in a direction close to or away from the rotating assembly 14 to compress the first elastic member 16.

The first elastic member 16 in the compressed state gives a rebound force to the rotating assembly 14, such that the first mating portion 1411 closely abuts against the second mating portion 1511, i.e., the rotating assembly 14 closely abuts against the first sliding member 151. In addition, the rebound force given by the first elastic member 16 (as shown in F1 in FIG. 1) may be converted into a certain pressure given by the rotating assembly 14 to the first sliding member 151. The friction between the rotating assembly 14 and the sliding assembly 15 is positively correlated with the pressure, i.e. the greater the positive pressure, the greater the friction. When the friction force is greater than a predetermined value and the rotating assembly 14 stops rotating, the rotating assembly 14 does not rotate relative to the sliding assembly 15, and the sliding assembly 15 is relatively stationary relative to the rotating assembly 14, i.e., the rotating assembly 14 is in a stationary state. The stationary state means that when the rotating assembly 14 stops rotating, the rotating assembly 14 will not rotate relative to the sliding assembly 15 due to its own gravity, external force, etc. It can be understood that, under the action of the rebound force of the first elastic member 16, the rotating assembly 14 gives an additional pressure to the sliding assembly 15, such that the friction between the rotating assembly 14 and the sliding assembly 15 is greater than a predetermined value, and the sliding assembly 15 will not rotate relative to the rotating assembly 14, so as to maintain the rotating assembly 14 in a stationary state, whereby the rotating assembly 14 realizes the functions of hovering, self-tightening, etc. The predetermined value may be the gravity of the rotating assembly 14, or an additional force such as a push force, a pull force, etc., to which the rotating assembly 14 is subjected. For example, when the extension direction of the rotating assembly 14 is parallel to the direction of gravity, the predetermined value may be the gravity force of the rotating assembly 14; when the extension direction of the rotating assembly 14 is unparallel to the direction of gravity, the predetermined value may be a push force, a pull force, the gravity force of the rotating assembly 14, etc., to which the rotating assembly 14 is subjected.

In addition, when the rotating assembly 14 is required to continue to rotate, a force greater than the predetermined force is required to be provided to cause the rotating assembly 14 to change from a state in which it is stationary relative to the sliding assembly 15 to a state in which it rotates relative to the sliding assembly 15. When an external force greater than the predetermined force is provided, the rotating assembly 14 can be caused to continue to rotate, and the rotating assembly 14 is shifted from sliding in a direction away from the sliding assembly 15 to sliding in a direction close to the sliding assembly 15. When the rotating assembly 14 is sliding in the direction close to the sliding member and the first elastic member 16 is in a compressed state, since the first elastic member 16 is reverting to deformation at this time, the rebound force of the first elastic member 16 decreases, the pressure provided by the first elastic member 16 decreases, the friction of the rotating assembly 14 on the sliding assembly 15 decreases, and a less force is required to make the rotating assembly 14 rotate. In this way, the rotating assembly 14 is easier to rotate, and under the action of the rebound force of the first elastic member 16, the rotating assembly 14 is accelerated to slide in a direction close to the sliding assembly 15, so as to prepare for a next hovering of the torque module 1.

It is to be noted that the torque provided by the torque module 1 is related to the friction force, and the friction force changes as the rotating assembly 14 or the sliding assembly 15 slides relative to the rotating shaft 11 during the rotation of the rotating assembly 14. It also be understood that the torque provided by the torque module 1 can become greater or less as the rotating assembly 14 or the sliding assembly 15 changes the state of the first elastic member 16.

In summary, compared to the structure in the related art in which only a cam is applied to realize the hovering function, the present embodiments, by setting the first mating portion 1411, the second mating portion 1511, and the first elastic member 16 to cooperate with each other, can provide a greater friction force, so as to improve friction performance and improve the effect of the hovering and self-tensioning effect while enabling the rotating assembly 14 to realize the functions of hovering and self-tensioning, and the like. In other words, the torque module 1 of the present embodiments has a smaller size and improves the compactness of the structure of the torque module 1 when the same size of friction force is required to be provided.

Figure 3:
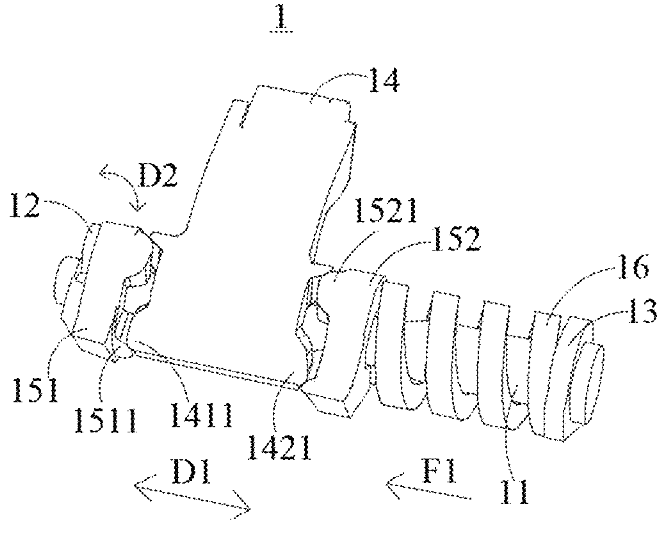
FIG. 3 is a perspective structural schematic view of a torque module according to other embodiments of the present disclosure.
Figure 4:
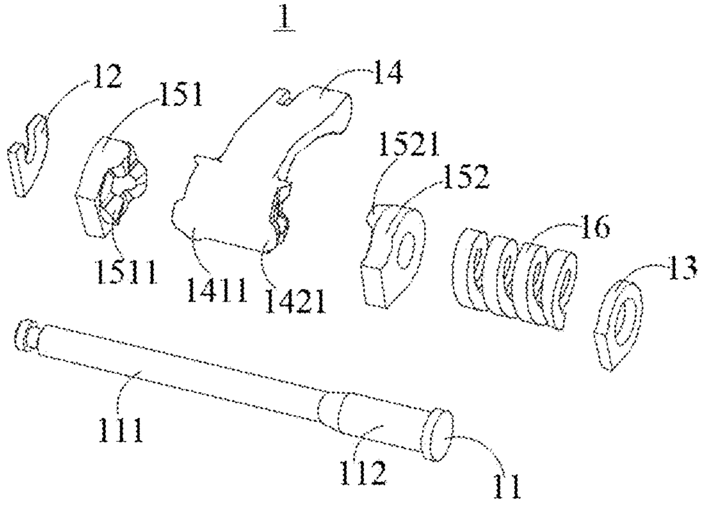
FIG. 4 is an exploded view of FIG. 3 according to some embodiments of the present disclosure.

Referring to FIGS. 3-FIG. 4, FIG. 3 is a perspective structural schematic view of a torque module according to other embodiments of the present disclosure, and FIG. 4 is an exploded view of FIG. 3 according to some embodiments of the present disclosure. In some embodiments, a portion of the rotating assembly 14 sleeved on the rotating shaft 11 is arranged with a third mating portion 1421 on a side near the second blocking member 13. The sliding assembly 15 further includes a second sliding member 152 sleeved on the rotating shaft 11 and disposed on a side of the rotating assembly 14 near the second blocking member 13, and a portion of the second sliding member 152 sleeved on the rotating shaft 11 is arranged with a fourth mating portion 1521 on a side near the third mating portion 1421.

The rotation of the rotating assembly 14 further enables the third mating portion 1421 and the fourth mating portion 1521 to cooperate with each other in order to allow the sliding assembly 15 to slide in a direction close to or away from the rotating assembly 14. When the sliding assembly 15 is sliding in a direction away from the rotating assembly 14, the first elastic member 16 is in a compressed state and the third mating portion 1421 and the fourth mating portion 1521 abut against each other. In this way, when the rotating assembly 14 stops rotating, the rotating assembly 14 remains stationary relative to the sliding assembly 15.

The rotating assembly 14 further includes the third mating portion 1421, and it should be noted that in actual production, the rotating assembly 14, the first mating portion 1411, and the third mating portion 1421 may be in a one-piece structure, and the rotating assembly 14, the first mating portion 1411, and the third mating portion 1421 are artificially named differently for ease of understanding. The present disclosure does not limit the shape of the third mating portion 1421, as long as the third mating portion 1421 and the fourth mating portion 1521 can cooperate with each other. The third mating portion 1421 is arranged on a portion of the rotating member that is sleeved on the rotating shaft 11, i.e., the third mating portion 1421 is corresponds to an outer peripheral edge of the rotating shaft 11, so as to enable the rotating assembly 14 to cooperate with the other components when rotating to any angle. It can be understood that the third mating portion 1421 has a through hole through which the rotating shaft 11 passes. In addition, the third mating portion 1421 is arranged on a side of the rotating assembly 14 near the second blocking member 13, and the first mating portion 1411 is arranged on a side of the rotating assembly 14 near the first blocking member 12, such that the first mating portion 1411 and the third mating portion 1421 are disposed on opposite sides of the rotating assembly 14. Regarding the structure of the third mating portion 1421, the present disclosure will be described in detail below.

The sliding assembly 15 further includes the second sliding member 152, and the second sliding member 152 is axially slidable relative to the rotating shaft 11 and arranged with the fourth mating portion 1521. It is to be noted that, in actual production, the second sliding member 152 and the fourth mating portion 1521 are may be in a one-piece structure, and the second sliding member 152 and the fourth mating portion 1521 are artificially named differently for ease of understanding. The material of the second sliding member 152 includes, but is not limited to, plastic, metal, etc., and the present embodiments do not limit the shape of the second sliding member 152. The second sliding member 152 may be of any shapes, as long as the second sliding member 152 is arranged with the fourth mating portion 1521. Moreover, the present disclosure does not limit the shape of the fourth mating portion 1521, as long as the third mating portion 1421 and the fourth mating portion 1521 can cooperate with each other. The fourth mating portion 1521 is arranged on a portion of the second sliding member 152 that is sleeved on the rotating shaft 11, such that the fourth mating portion 1521 can also slide relative to the rotating shaft 11. It can be understood that the fourth mating portion 1521 has a through hole through which the rotating shaft 11 passes. Regarding the structure of the fourth mating portion 1521 and the specific manner in which the third mating portion 1421 and the fourth mating portion 1521 fit together, the present disclosure will be described in detail below.

As shown in FIG. 3, when the rotating assembly 14 rotates relative to the sliding assembly 15 (as shown in the direction of D2 in FIG. 3), the first mating portion 1411 and the second mating portion 1511 cooperate with each other, and the third mating portion 1421 and the fourth mating portion 1521 cooperate with each other to cause the rotating assembly 14 to slide in a direction close to or away from the first sliding member 151 (as shown in the direction of D1 in FIG. 3). It can be understood that when the rotating assembly 14 rotates relative to the sliding assembly 15, the first mating portion 1411 rotates relative to the second mating portion 1511 and the third mating portion 1421 rotates relative to the fourth mating portion 1521. Since the first mating portion 1411 and the second mating portion 1511 can cooperate with each other and the third mating portion 1421 and the fourth mating portion 1521 can cooperate with each other, the rotating assembly 14 slides in a direction close to or away from the sliding assembly 15.

In some embodiments, when the first blocking member 12 abuts against the first sliding member 151, the first blocking member 12 limits the sliding of the first sliding member 151 in the axial direction of the rotating shaft 11, such that when the rotating assembly 14 is rotating, the first mating portion 1411 rotates relative to the second mating portion 1511 and the third mating portion 1421 rotates relative to the fourth mating portion 1521, so as to make the rotating assembly 14 and the second sliding member 152 move in a direction away from the first sliding member 151. In this way, the second sliding member 152 contacts and compresses the first elastic member 16, converting the rebound force into friction force to realize the hovering of the torque module 1.

In other embodiments, a gap exists between the first blocking member 12 and the first sliding member 151, such that when the rotating assembly 14 rotates, the first mating portion 1411 rotates relative to the second mating portion 1511 and the third mating portion 1421 rotates relative to the fourth mating portion 1521, so as to make the first sliding member 151 slide in a direction away from the rotating assembly 14 and the second sliding member 152 slide in a direction away from the rotating assembly 14. In this way, the second sliding member 152 contacts and compresses the first elastic member 16, converting the rebound force into friction force to realize the hovering of the torque module 1.

In further other embodiments, when the rotating assembly 14 rotates, the first mating portion 1411 rotates relative to the second mating portion 1511 and the third mating portion 1421 rotates relative to the fourth mating portion 1521 to cause the first sliding member 151 to slide in a direction close to the rotating assembly 14, the second sliding member 152 to move in a direction close to the rotating assembly 14, and the first elastic member 16 to be in a compressed state, in which case the first elastic member 16 is reverting to deformation and the rebound force of the first elastic member 16 is reduced. Therefore, the pressure provided by the first elastic member 16 decreases, the friction force of the rotating assembly 14 on the sliding assembly 15 decreases, and only a less force is required to make the rotating assembly 14 rotate. In this way, the rotating assembly 14 is easier to rotate, and under the action of the rebound force of the first elastic member 16, the rotating assembly 14 is accelerated to slide in a direction close to the sliding assembly 15, so as to prepare for a next hovering of the torque module 1.

In summary, when the rotating assembly 14 slides in a direction close to or away from the sliding assembly 15, the second sliding member 152 contacts and compresses the first elastic member 16, in which case the first elastic member 16 in the compressed state gives the second sliding member 152 a rebound force, such that the first mating portion 1411 closely abuts against the second mating portion 1511 and the third mating portion 1421 closely abuts against the fourth mating portion 1521, i.e., the rotating assembly 14 closely abuts against the sliding assembly 15. In addition, the rebound force given by the first elastic member 16 (as shown in F1 in FIG. 3) may be converted into a certain pressure given by the first sliding member 151 to the rotating assembly 14 and the second sliding member 152. Under the action of the rebound force of the first elastic member 16, the friction between the rotating assembly 14 and the sliding assembly 15 is greater than a predetermined value, and the sliding assembly 15 will not rotate relative to the rotating assembly 14, thereby maintaining the rotating assembly 14 in a stationary state, and enabling the rotating assembly 14 to realize functions such as hovering and self-tightening.

In summary, different from the related art in which only the first mating portion 1411 and the second mating portion 1511 are provided, the present embodiments, by providing the first mating portion 1411, the second mating portion 1511, the third mating portion 1421, the fourth mating portion 1521, and the first elastic member 16 in mutual cooperation, can further improve the compression of the first elastic member 16, as compared to the case in which only the first mating portion 1411 and the second mating portion 1511 are provided. In this way, the rebound force of the first elastic member 16 can be further increased, thereby further providing a greater friction force, further improving the friction performance, and further improving the hovering and self-tightening effect while enabling the rotating assembly 14 to realize the functions of hovering and self-tightening. In addition, the size of the torque module 1 of the present embodiments is further reduced when a same size of friction force is required to be provided, thereby further improving the compactness of the structure of the torque module 1. Moreover, the present embodiments may realize the positional limitation and blocking effect by means of the blocking members arranged on both sides, such that the torque module 1 can realize the above movement by itself, and thus the torque module 1 can be formed independently as a torsion assembly, which is easy to be assembled.

Figure 5:
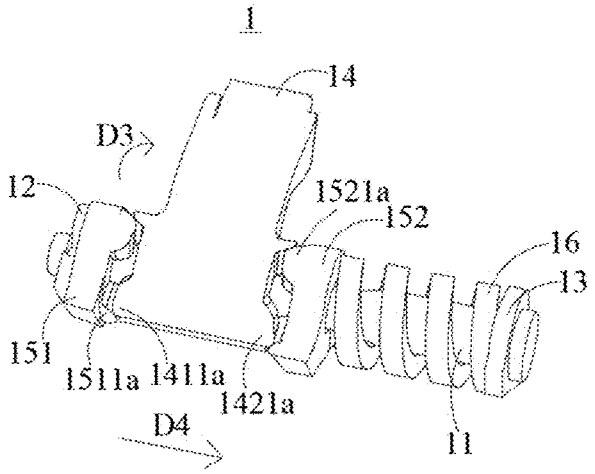
FIG. 5 is a schematic diagram showing a fit between a first mating portion and a second mating portion and a fit between a third mating portion and a fourth mating portion according to some embodiments of the present disclosure.
Figure 6:
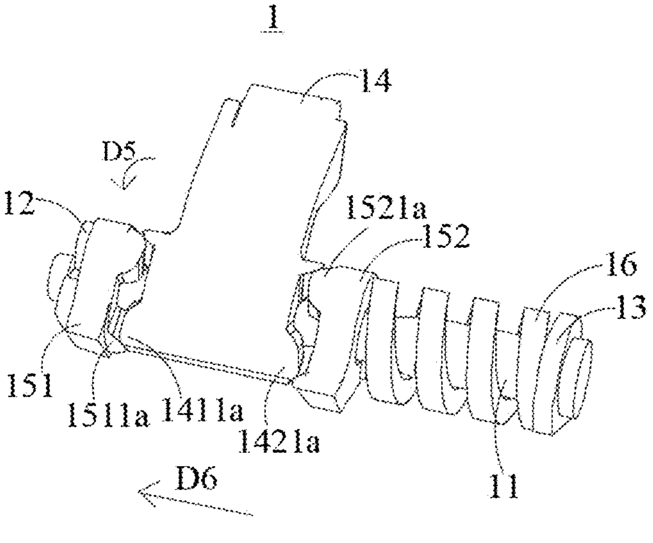
FIG. 6 is a schematic diagram showing a fit between a first mating portion and a second mating portion and a fit between a third mating portion and a fourth mating portion according to other embodiments of the present disclosure.

The specific structure of the first mating portion 1411, the second mating portion 1511, the third mating portion 1421, and the fourth mating portion 1521 is described next. Referring to FIGS. 5-FIG. 6, FIG. 5 is a schematic diagram showing a fit between a first mating portion and a second mating portion and a fit between a third mating portion and a fourth mating portion according to some embodiments of the present disclosure, and FIG. 6 is a schematic diagram showing a fit between a first mating portion and a second mating portion and a fit between a third mating portion and a fourth mating portion according to other embodiments of the present disclosure.

In the embodiments, the first mating portion 1411 includes multiple first protrusions 1411*a* spaced apart, the second mating portion 1511 includes multiple second protrusions 1511*a* spaced apart, the third mating portion 1421 includes multiple third protrusions 1421*a* spaced apart, and the fourth mating portion 1521 includes multiple fourth protrusions 1521*a* spaced apart; where each of the first protrusions 1411*a*, the second protrusions 1511*a*, the third protrusions 1421*a*, and the fourth protrusions 1521*a* has a crest, the crest of the first protrusion 1411*a* is disposed symmetrically with the crest of the third protrusion 1421*a*, and the crest of the second protrusion 1511*a* is disposed symmetrically with the crest of the fourth protrusion 1521*a*.

When the sliding assembly 15 slides in a direction away from the rotating assembly 14, and the crest of the first protrusion 1411*a* is in contact with the crest of the second protrusion 1511*a* and the crest of the third protrusion 1421*a* is in contact with the crest of the fourth protrusion 1521*a*, the first elastic member 16 is in a compressed state and causes the sliding assembly 15 to abut against the rotating assembly 14.

The crest is a highest point of the protrusion. In addition to the crest, of course, each of the first protrusion 1411*a*, the second protrusion 1511*a*, the third protrusion 1421*a*, and the fourth protrusion 1521*a* has a trough and a beveled surface. The trough refers to a lowest point of the protrusion, and the beveled surface refers to a side between the crest and the trough.

It is to be noted that since the crest of the first protrusion 1411*a* is symmetrically disposed with the crest of the third protrusion 1421*a*, and the crest of the second protrusion 1511*a* is symmetrically disposed with the crest of the fourth protrusion 1521*a*, when the crest of the first protrusion 1411*a* is opposite to the crest of the second protrusion 1511*a*, the crest of the third protrusion 1421*a* is opposite to the crest of the fourth protrusion 1521*a*; and when the crest of the first protrusion 1411*a* is opposite to the trough of the second protrusion 1511*a*, the crest of the third protrusion 1421*a* is opposite to the trough of the fourth protrusion 1521*a*. It can be understood that the cooperation state between the first protrusion 1411*a* and the second protrusion 1511*a* is the same as the cooperation state between the third protrusion 1421*a* and the fourth protrusion 1521*a*.

In some embodiments, when the rotating assembly 14 is not rotating relative to the sliding assembly 15, the cooperation state between the first protrusion 1411*a* and the second protrusion 1511*a* and the cooperation state between the third protrusion 1421*a* and the fourth protrusion 1521*a* are both "crest opposite to trough". When the rotating assembly 14 rotates relative to the sliding assembly 15, the cooperation state between the first protrusion 1411*a* and the second protrusion 1511*a* is that the crest slides along the beveled surface until the crest is opposite to the trough, and the cooperation state between the third protrusion 1421*a* and the fourth protrusion 1521*a* is always the same as the cooperation state between the first protrusion 1411*a* and the second protrusion 1511*a*.

When the crest of the first protrusion 1411*a* is opposite to the crest of the second protrusion 1511*a* and the crest of the third protrusion 1421*a* is opposite to the crest of the fourth protrusion 1521*a*, the spacing between the sliding assembly 15 and the rotating assembly 14 is the greatest, and accordingly, the compression of the first elastic member 16 is more obvious, such that a greater rebound force can be provided, thereby further improving the friction performance of the torque module 1 and improving the hovering, self-tightening effect. When the rotating assembly 14 continues to rotate relative to the sliding assembly 15 under the action of the external force, the cooperation state of the first protrusion 1411*a* and the second protrusion 1511*a* is that the crest continues to slide along the beveled surface until the crest is opposite to the trough, and the cooperation state between the third protrusion 1421*a* and the fourth protrusion 1521*a* is always the same as that between the first protrusion 1411*a* and the second protrusion 1511*a*, during which the spacing between the sliding assembly 15 relative to the rotating assembly 14 gradually decreases, and accordingly, the compression of the first elastic member 16 is weakened, such that the rebound force that can be provided decreases, which makes the rotating assembly 14 easier to rotate due to the decrease in friction. Eventually, the first protrusion 1411*a* and the second protrusion 1511*a*, as well as the third protrusion 1421*a* and the fourth protrusion 1521*a* will repeat the above movement in preparation for the next hovering of the torque module 1.

It can be understood that when the crest of the first protrusion 1411*a* is opposite the crest of the second protrusion 1511*a* and the crest of the third protrusion 1421*a* is opposite the crest of the fourth protrusion 1521*a*, the crests of the first protrusion 1411*a* and the second protrusion 1511*a* may cause the sliding assembly 15 to slide relative to the rotating assembly 14 to compress the first elastic member 16, thereby providing an amount of compression; and the crests of the third protrusion 1421*a* and the fourth protrusion 1521*a* may also cause the sliding assembly 15 to slide relative to the rotating assembly 14 to compress the first elastic member 16, thereby providing an amount of compression. Therefore, two amounts of compression may be provided, which increases the rebound force of the first elastic member 16, thereby increasing the friction between the rotating assembly 14 and the sliding assembly 15.

Since the torque module 1 can realize hovering and self-tightening when the crests are opposite each other, the number, position, and size of the protrusions can determine the angle of hovering. For example, in a case where the number of the first protrusions 1411*a* of the first mating portion 1411 is six, the first protrusions 1411*a* are evenly spaced apart, and the third protrusions 1421*a* are disposed correspondingly opposite to the first protrusions 1411*a*, the hovering of the torque module 1 can be realized for every 60° of rotation of the rotating assembly 14 relative to the sliding assembly 15.

As shown in FIGS. 5 and 6, in the embodiments, when the rotating assembly 14 rotates relative to the sliding assembly 15, the first protrusion 1411*a* rotates relative to the second protrusion 1511*a*, and the third protrusion 1421*a* rotates relative to the fourth protrusion 1521*a*, in which case the sliding assembly 15 slides in a direction of close to or away from the rotating assembly 14. Since the cooperation state between the first protrusion 1411*a* and the second protrusion 1511*a* is the same as the cooperation state between the third protrusion 1421*a* and the fourth protrusion 1521*a*, a first cooperation state between the first mating portion 1411 and the second mating portion 1511 and between the third mating portion 1421 and the fourth mating portion 1521 is that when the crest of the second protrusion 1511*a* rotates oriented in a direction proximate to the crest of the first protrusion 1411*a*, and the crest of the fourth protrusion 1521*a* rotates oriented in a direction proximate to the crest of the third protrusion 1421*a* (as shown in the direction of D3 in FIG. 5), the sliding assembly 15 slides in a direction away from the rotating assembly 14 (as shown in the direction of D4 in FIG. 5); and a second cooperation state is that when the crest of the second protrusion 1511*a* rotates oriented in a direction proximate to the trough of the first protrusion 1411*a*, and the crest of the fourth protrusion 1521*a* rotates oriented in a direction proximate to the trough of the third protrusion 1421*a* (as shown in the direction of D5 in FIG. 6), the sliding assembly 15 slides in a direction close to the rotating assembly 14 (as shown in the direction of D6 in FIG. 6).

In addition, when the sliding assembly 15 slides in the direction away from the rotating assembly 14 and the crest of the first protrusion 1411*a* contacts the crest of the second protrusion 1511*a*, the second sliding member 152 abuts against the first elastic member 16 such that the rebound force is converted into a friction force, thereby enabling the rotating assembly 14 to realize hovering, self-tightening, etc. Therefore, compared to the technical solution where only the first protrusion 1411*a* and the second protrusion 1511*a* are provided, the present embodiments may realize the hovering function by providing the first protrusion 1411*a*, the second protrusion 1511*a*, the third protrusion 1421*a*, the fourth protrusion 1521*a*, and the first elastic member 16 in cooperation, thereby making the size of the torque module 1 smaller, which further improves the compactness of the structure of the torque module 1.

Figure 7:
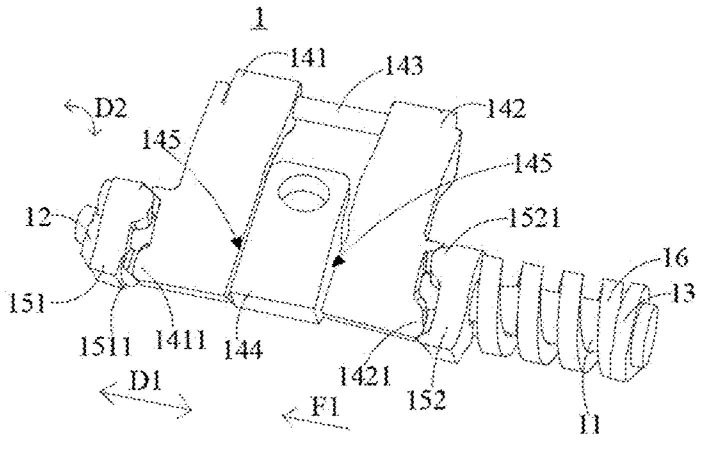
FIG. 7 is a perspective structural schematic view of a torque module according to further other embodiments of the present disclosure.

Referring to FIG. 7, FIG. 7 is a perspective structural schematic view of a torque module according to further other embodiments of the present disclosure. In some embodiments, the rotating assembly 14 includes a first rotating member 141, a second rotating member 142, a connecting member 143, and a bracket 144. The first rotating member 141 is sleeved on the rotating shaft 11 and is disposed on a side close to the first sliding member 151, and a side of the first rotating member 141 close to the first sliding member 151 is arranged with a first mating portion 1411. The second rotating member 142 is sleeved on the rotating shaft 11 and is disposed on a side close to the second sliding member 152, and a side of the second rotating member 142 close to the second sliding member 152 is arranged with a third mating portion 1421. An end of the connecting member 143 is connected to the first rotating member 141, and the other end of the connecting member 143 is connected to the second rotating member 142. The bracket 144 is sleeved on the rotating shaft 11 and is disposed between the first rotating member 141 and the second rotating member 142.

The torque module 1 provided in the embodiments includes the first rotating member 141 and the second rotating member 142, where the first rotating member 141 and the second rotating member 142 are rotatable, and the first rotating member 141 and the second rotating member 142 may be connected to other components to rotate them. The present embodiments do not limit the shapes and materials of the first rotating member 141 and second rotating member 142. The first mating portion 1411 is arranged on a side of the first rotating member 141 back from the second rotating member 142, and the third mating portion 1421 is arranged on a side of the second rotating member 142 back from the first rotating member 141. It should be noted that in actual production, the first rotating member 141 and the first mating portion 1411 may be in a one-piece structure, and the second rotating member 142 and the third mating portion 1421 may be in a one-piece structure. However, the first rotating member 141, the first mating portion 1411, the second rotating member 142, and the third mating portion 1421 are artificially named differently for ease of understanding.

The torque module 1 provided in the embodiments includes the connecting member 143, which is configured to connect different components. The present embodiments do not limit the shape and material of the connecting member 143. The connection methods of the connecting member 143 include, but are not limited to, a fixed connection, a snap connection, an interference fit, etc. Since one end of the connecting member 143 is connected to the first rotating member 141 and the other end of the connecting member 143 is connected to the second rotating member 142, when one of the first rotating member 141 or the second rotating member 142 rotates relative to the sliding assembly 15, the other of the first rotating member 141 and the second rotating member 142 can be driven to rotate synchronously through the connecting member 143. The first rotating member 141 and the second rotating member 142 have the same rotation angle. In some embodiments, the connecting member 143 may be a pin.

The torque module 1 provided in the embodiments includes the bracket 144, which is configured to fix and support other components. The present embodiments do not limit the shape and material of the bracket 144. The bracket 144 is sleeved on the rotating shaft 11, the bracket 144 is axially slidable relative to the rotating shaft 11, and the bracket 144 is peripherally stationary relative to the rotating shaft 11. In some embodiments, the bracket 144 defines a mounting space, and the mounting space can be configured for connecting with other components, thereby improving the connecting performance of the torque module 1 with other components and broadening the applications of the torque module 1. In some embodiments, the mounting space includes, but is not limited to, a mounting hole, a mounting groove, and etc.

As shown in FIG. 7, when the first rotating member 141 rotates relative to the sliding assembly 15 (in the direction shown in D2 in FIG. 7), the second rotating member 142 is driven to rotate synchronously through the connecting member 143, such that the first mating portion 1411 rotates relative to the second mating portion 1511, and the third mating portion 1421 rotates relative to the fourth mating portion 1521 at the same time, so as to cause the sliding assembly 15 to move in a direction close to or away from the rotating assembly 14 (in the direction shown as D1 in FIG. 7). That is, the first sliding member 151 moves in a direction close to or away from the first rotating member 141 and the second sliding member 152 moves in a direction close to or away from the second rotating member 142, so as to cause the second sliding member 152 to compress the first elastic member 16, converting a rebound force (as shown as F1 in FIG. 7) to friction, and causing the first rotating member 141 and the second rotating member 142 to be stationary relative to the sliding assembly 15 at the same time, thereby realizing hovering. By virtue of the above setup, the present embodiments may improve the hovering and self-tightening effect by providing the first rotating member 141, the second rotating members 142, the connecting member 143, and the bracket 144, that are able to cooperate with the sliding assembly 15 and the first elastic member 16.

It is to be noted that during the axial sliding of the rotating assembly 14 relative to the rotating shaft 11, the bracket 144 is always disposed between the first rotating member 141 and the second rotating member 142 and slides, together with the first rotating member 141 and the second rotating member 142, in a direction close to or away from the sliding assembly 15 at the same time.

In some embodiments, when the first rotating member 141 rotates, the first mating portion 1411 is cause to cooperate with the second mating portion 1511, such that the first sliding member 151 moves in a direction close to or away from the first rotating member 141. However, since the bracket 144 is disposed on a side of the first rotating member 141 back from the first sliding member 151, the bracket 144 may limit the axial sliding of the first rotating member 141 relative to the rotating shaft 11, such that the first rotating member 141 is axially stationary relative to the rotating shaft 11, i.e., the first rotating member 141 cannot slide relative to the rotating shaft 11.

In some embodiments, as shown in FIG. 7, an abutting position between the first rotating member 141 or the second rotating member 142 in the rotating assembly 14 and the bracket 144 is arranged with a friction surface 145, or an abutting position between each of the first rotating member 141 and the second rotating member 142 in the rotating assembly 14 and the bracket 144 is arranged with a friction surface 145. The present embodiments are illustrated schematically taking the friction surface 145 at the abutting position between the first rotating member 141 and the bracket 144 as an example, which does not mean that the friction surface 145 can be arranged only at the abutting position between the first rotating member 141 and the bracket 144. When the first rotating member 141 rotates and abuts against the bracket 144, the first rotating member 141 rotates relative to the bracket 144, and thus the first rotating member 141 and the bracket 144 rub against each other at the friction surface 145, thereby generating peripheral friction. By providing the friction surface 145, the friction force in the torque module 1 may be further increased to further improve the hovering effect.

Figure 8:
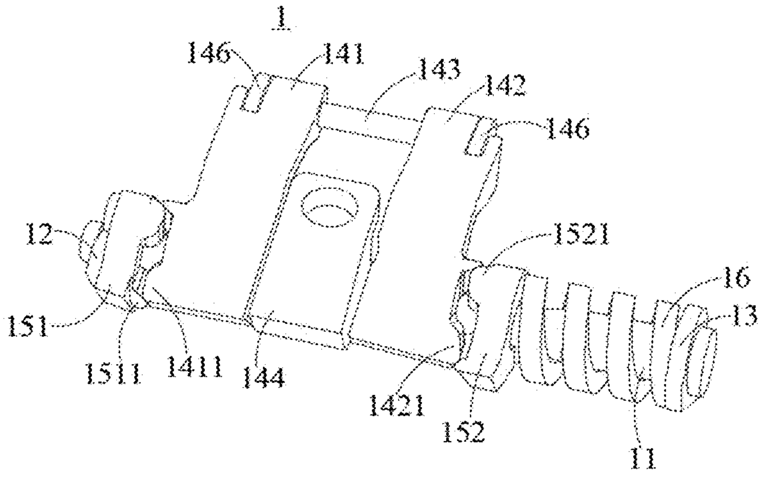
FIG. 8 is a perspective structural schematic view of a torque module according to still other embodiments of the present disclosure.

Referring to FIG. 8, FIG. 8 is a perspective structural schematic view of a torque module according to still other embodiments of the present disclosure. In some embodiments, the first rotating member 141 is sleeved on an end of the connecting member 143, and the second rotating member 142 is sleeved on the other end of the connecting member 143. The torque module 1 further includes two limiting members 146, where an end of the connecting member 143 is connected to one of the two limiting members 146, and the other end of the connecting member 143 is connected to the other of the two limiting members 146. One of the two limiting members 146 is fixed to an end of the first rotating member 141 back from the second rotating member 142, and the other of the two limiting members 146 is fixed to an end of the second rotating member 142 back from the first rotating member 141.

The torque module 1 in the embodiments includes the limiting member 146, which is configured to to connect other components to limit the position of them. The present embodiments do not limit the shapes and materials of the limiting member 146. The limiting member 146 is connected to the first rotating member 141 or the second rotating member 142, and the connection methods include, but are not limited to, a fixed connection, a snap connection, and a hinge connection. In the embodiments, the snap connection is illustrated schematically. In some embodiments, a side of the limiting member 146 near the rotating assembly 14 is arranged with a first snap portion, and a corresponding second snap portion is arranged on a side of the rotating assembly 14 near the first snap portion, with at least a portion of the first snap portion being arranged within the second snap portion. When the first snap portion is a protrusion, the second snap portion is a groove; when the first snap portion is a groove, the second snap portion is a protrusion.

As shown in FIG. 8, the first rotating member 141 and the second rotating member 142 are respectively sleeved on the two ends of the connecting member 143. It can be understood that the connecting member 143 extends through the first rotating member 141 and the second rotating member 142, and each of the opposing ends of the connecting member 143 is connected to a corresponding limiting member 146. The limiting member 146 is connected to the connecting member 143 and the rotating assembly 14, such that the connecting member 143 is stabilized in the torque module 1 to prevent the connecting member 143 from falling down when the first rotation member 141 and the second rotation member 142 are moving, thereby ensuring that the connecting member 143 connects the first rotation member 141 and the second rotation member 142, and improving the stability of the operation of the torque module 1. In addition, when the limiting member 146 is connected to the rotating assembly 14 in a detachable connection, the loss of the first rotation member 141 and the second rotation member 142 can be avoided when the torque module 1 is disassembled, such that the component recovery rate can be improved.

Figure 9:
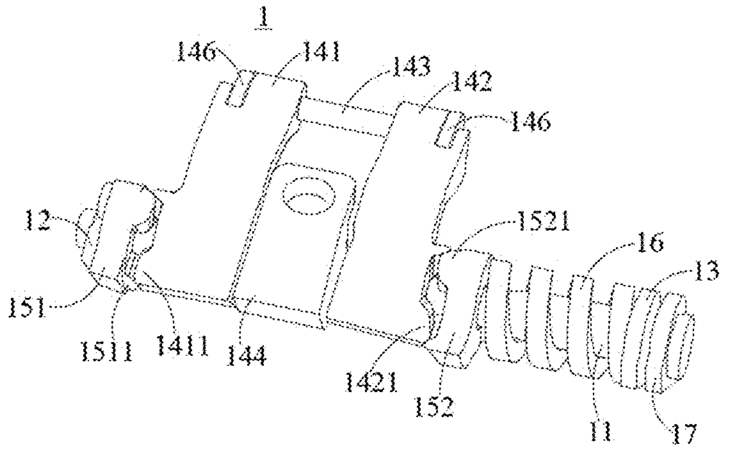
FIG. 9 is a perspective structural schematic view of a torque module according to still other embodiments of the present disclosure.

Referring to FIG. 9, FIG. 9 is a perspective structural schematic view of a torque module according to still other embodiments of the present disclosure. In some embodiments, the torque module 1 further includes a friction member 17, fixed to the rotating shaft 11 and disposed on a side of the second blocking member 13 back from the rotating assembly 14. The rotation of the rotating assembly 14 is able to rotate the friction member 17 relative to the second blocking member 13.

The friction member 17 is typically configured to provide friction. Moreover, the material of the friction member 17 includes, but is not limited to, plastic, metal, etc., and the present embodiments do not limit the shape of the friction member 17. The friction member 17 may be of any shapes, as long as it can provide friction to the elastic member. The friction member 17 is sleeved on the rotating shaft 11, i.e., the friction member 17 has a through hole through which the rotating shaft 11 passes.

As shown in FIG. 9, when the rotating assembly 14 rotates, the friction member 17 rotates relative to the second blocking member 13, and the friction member 17 rubs against the second blocking member 13 in the opposite direction, thereby generating a peripheral friction force. When an end of the first elastic member 16 gives a rebound force to the sliding assembly 15, the other end of the first elastic member 16 also gives a rebound force to the second blocking member 13, thereby causing the second blocking member 13 to give pressure to the friction member 17. As the degree of compression of the first elastic member 16 increases, the pressure keeps increasing, and thus the peripheral friction keeps increasing, which may further improve the hovering and self-tightening effect of the torque module 1, such that the size of the torque module 1 of the present embodiments may be further reduced, thereby further improving the compactness of the structure of the torque module 1.

Figure 10:
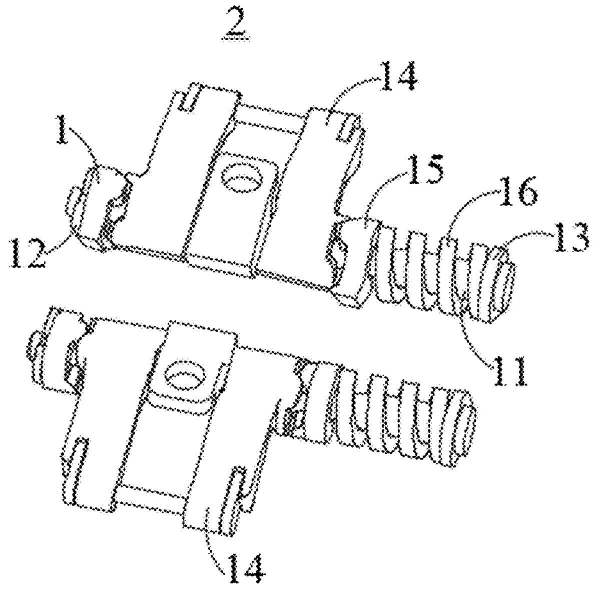
FIG. 10 is a perspective structural schematic view of a rotating shaft assembly according to some embodiments of the present disclosure.

Referring to FIG. 10, FIG. 10 is a perspective structural schematic view of a rotating shaft assembly according to some embodiments of the present disclosure. The present disclosure further provides a rotating shaft assembly 2, including the torque module 1 as provided herein; where two the torque modules 1 are disposed axially symmetrically and the rotating assembly 14 in one of the torque modules 1 being is in a direction extending away from the rotating assembly 14 in the other the torque module 1.

The rotating shaft assembly 2 of the present embodiments includes two torque modules 1, which have been described in detail above and will not be repeated herein. The two torque modules 1 are disposed axially symmetrically, which may be understood that the two torque modules 1 are disposed symmetrically along the axial direction of the rotating shaft 11. Due to the axisymmetric setting, the two rotating shafts 11 are adjacent to each other, such that the size of the rotating shaft assembly 2 may be reduced. The rotating shaft assembly 2 may rotate the two rotating assemblies 14 relative to each other, which may be understood as causing the two rotating assemblies 14 to move in a direction close to each other or away from each other.

Moreover, one of the rotating assemblies 14 in the rotating shaft assembly 2 extends in a direction away from the other rotating assembly 14, such that the two rotating assemblies 14, when rotating synchronously, simultaneously move in a direction away from or close to the rotating shafts 11, i.e., the two rotating assemblies 14 rotate back away or toward each other relatively, such that the two rotating assemblies 14 are avoided from rotating in the same direction.

As shown in FIG. 10, the rotating shaft assembly 2, by including the torque modules 1 provided in the present disclosure, can provide pressure and thus friction through the first elastic member 16, so as to improve the hovering and self-tightening effect as compared to the related art. In addition, when the same friction is required to be provided to realize the hovering, the rotating shaft assembly 2 in the present embodiments can be in a smaller size, which improves the compactness of the structure of the rotating shaft assembly 2. Moreover, by adopting the smaller-sized torque modules 1, a gap between the two torque modules 1 in the rotating shaft assembly 2 is made smaller. It can be understood that by adopting the smaller-sized torque modules 1, the bending radius of the rotating shaft assembly 2 may be reduced, which results in a smaller gap between the two rotating assemblies 14 after bending.

In addition, in practice, the rotating shaft assembly 2 with a teardrop hinge is usually applied and the rotating shaft assembly 2 is made to be directly fastened to other components. If a component is damaged, it is easy to scrap the whole hinge, i.e., the rotating shaft assembly 2 is scrapped, which is unfavorable for assembly and maintenance. In response thereto, in the present embodiments, the torque module 1 provided in the present disclosure is adopted to form the rotating shaft assembly 2, and the first blocking member 12, the rotating assembly 14, the sliding assembly 15, the first elastic member 16, and the second blocking member 13 can cooperate with each other, such that the rotating shaft assembly 2 can independently rotate or drive to synchronize the rotation of other components connected to the rotating assembly 14. In this way, no further elements, e.g., for a hinge fixation, are necessary to realize the hovering function. Therefore, by adopting the torque module 1 provided in the present disclosure, the first blocking member 12, the rotating assembly 14, the sliding assembly 15, the first elastic member 16, and the second blocking member 13 are sleeved on the rotating shaft 11 to realize hovering, thereby avoiding the use of a hinge in the related art, which simplifies the structure of the rotating shaft assembly 2 and makes the structure of the rotating shaft assembly 2 more compact and easier to assemble and disassemble, reducing the production cost.

Figure 11:
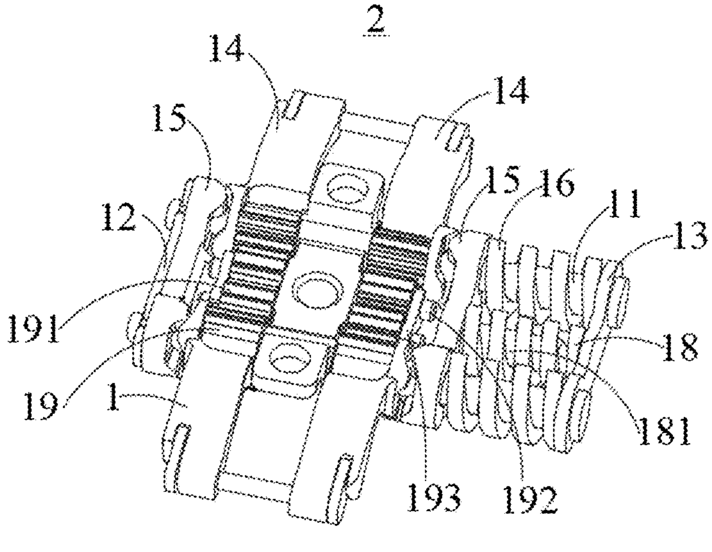
FIG. 11 is a perspective structural schematic view of a rotating shaft assembly according to other embodiments of the present disclosure.
Figure 12:
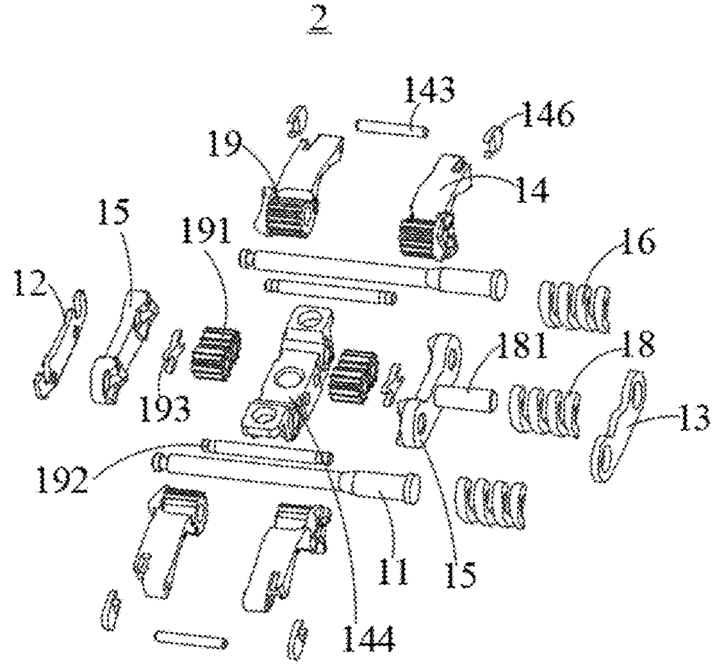
FIG. 12 is an exploded view of FIG. 11 according to some embodiments of the present disclosure.

Referring to FIGS. 11-FIG. 12, FIG. 11 is a perspective structural schematic view of a rotating shaft assembly according to other embodiments of the present disclosure, and FIG. 12 is an exploded view of FIG. 11 according to some embodiments of the present disclosure. In the embodiments, the sliding assembly 15 further includes a second sliding member 152 sleeved on the rotating shaft 11 and disposed on a side of the rotating assembly 14 near the second blocking member 13. The second sliding members 152 in the two torque modules 1 are connected to each other, and the second blocking members 13 in the two torque modules 1 are connected to each other. The rotating shaft assembly 2 further includes a second elastic member 18 disposed between a connection of the two second sliding members 152 and a connection of the two second blocking members 13.

The two second sliding members 152 are connected to each other, and the two second blocking members 13 are connected to each other. Since the second sliding member 152 and the second blocking member 13 have been described in detail above, the present disclosure will not repeat them herein. In some embodiments, the present disclosure does not limit the connection methods of the two second sliding members 152 and the two second blocking members 13, which include, but are not limited to, a fixed connection, a snap connection, etc. In some embodiments, the two second sliding members 152 are connected in a fixed connection, and the two second blocking members 13 are connected in a fixed connection. The two second sliding members 152 may be in a one-piece structure, and the two second blocking members 13 may be in a one-piece structure.

In some embodiments, the second elastic member 18 has a pre-compressed state. The pre-compressed state has been described in detail above, and the present disclosure will not repeat it herein.

In some embodiments, methods for the second elastic member 18 to be arranged between the connection of the two second sliding members 152 and the connection of the two second blocking members 13 include, but are not limited to, through an additional component, bonding, etc.

In some embodiments, the torque module 1 further includes a positioning member 181 disposed between the second sliding members 152 and the second blocking members 13, and the positioning member 181 is connected to the connection of the two second sliding members 152 or the connection of the two second blocking members 13; the second elastic member 18 is sleeved on the positioning member 181, and opposing ends of the second elastic member 18 are in contact with the connection of the two second sliding members 152 and the connection of the two second blocking members 13, respectively. The present embodiments are illustrated schematically with the provision of the positioning member 181.

As shown in FIG. 11, the second elastic member 18 deforms simultaneously with the first elastic member 16 when the sliding assembly 15 slides in a direction close to or away from the rotating assembly 14. It can be understood that when the first mating portion 1411 and the second mating portion 1511 cooperate with each other, the first elastic member 16 and the second elastic member 18 can be in a compressed state at the same time, thereby increasing the pressure given by the elastic members to the rotating assembly 14 and the sliding assembly 15, thereby increasing the friction between the rotating assembly 14 and the sliding assembly 15, such that the dimensions of the rotating shaft assembly 2 of the present embodiments may be further reduced, which further improves the compactness of the structure of the rotating shaft assembly 2.

In some embodiments, as shown in FIG. 11, the first sliding members 151 in the two torque modules 1 are connected to each other, and the first blocking members 12 in the two torque modules 1 are connected to each other. The connection methods include, but are not limited to, a fixed connection, a snap connection, etc. In some embodiments, the two first sliding members 151 are connected in a fixed connection, and the two first blocking members 12 are connected in a fixed connection. The two first sliding members 151 may be in a one-piece structure, and the two first blocking members 12 may be in a one-piece structure.

In some embodiments, the sliding assembly 15 may slide axially relative to the rotating shaft 11, but is peripherally stationary relative to the rotating shaft 11, i.e., the sliding assembly 15 cannot rotate relative to the rotating shaft 11 but can slide relative to the rotating shaft 11.

In some embodiments, the brackets 144 in both the rotating assemblies 14 are connected to each other as shown in FIG. 11. The connection methods include, but are not limited to, a fixed connection, a snap connection, etc. In some embodiments, the two brackets 144 are connected in a fixed connection. The two brackets 144 may be in a one-piece structure.

Referring again to FIGS. 11 and 12, in the embodiments, a peripheral side of a portion of the rotating assembly 14 sleeved on the rotating shaft 11 is further arranged with a transmission portion 19, and the rotating assembly further includes a synchronization assembly 191. An end of the synchronization assembly 191 is rotatably connected to one transmission portion 19, and the other end of the synchronization assembly 191 is rotatably connected to the other transmission portion 19, for synchronizing movement of the two torque modules 1.

The transmission portion 19 is configured to connect other components for transmission between them. The present embodiments do not limit the shape of the transmission portion 19, as along as it can realize transmission. In some embodiments, the transmission portion 19 includes multiple teeth disposed on the peripheral side of the portion of the rotating assembly 14 sleeved on the rotating shaft 11. In some embodiments, the transmission portion 19 of one torque module 1 is rotatably connected to the transmission portion 19 of the other torque module 1 to synchronize the movement of both the torque modules 1. It is to be noted that the rotational connection of the transmission portion 19 may be either a direct rotational connection or an indirect rotational connection by cooperating with another component, such as the synchronization assembly 191. In actual production, the transmission portion 19 and the rotating assembly 14 may be in a one-piece structure, and the transmission portion 19 and the rotating assembly 14 are artificially named differently for ease of understanding.

The synchronization assembly 191 includes, but is not limited to, a belt, a gear assembly, etc. The synchronized movement of the two torque modules 1 refers to a synchronized rotation of the two rotating assemblies 14 in a direction relatively towards or away from each other. It should be noted that in order to ensure the synchronized rotation of the two rotating assemblies 14 in the direction relatively towards or away from each other, when the synchronization assembly 191 is a gear assembly, the number of gears of the gear assembly is required to be an even number. In some embodiments, the synchronization assembly 191 includes a first sub-gear and a second sub-gear, the first sub-gear being rotatably connected to the second sub-gear. The first sub-gear is rotatably connected to one transmission portion 19, and the second sub-gear is rotatably connected to the other transmission portion 19.

As shown in FIG. 11, the transmission portions 19 rotates synchronously with the rotating member 14. When one rotating assembly 14 rotates in a direction close to or away from the other rotating assembly 14, the transmission portion 19 in the one rotating assembly 14 is caused to rotate in the same direction. The synchronization assembly 191 is rotatably connected to the two transmission portions 19, such that the transmission portion 19 drives the other transmission portion 19 to rotate in an opposite direction through the synchronization assembly 191, which in turn causes the other rotating assembly 14 to rotate in an opposite direction, so as to realize the synchronous movement of the two rotating assemblies 14. That is, the two rotating assemblies 14 rotate synchronously in a direction relatively towards or away from each other, so as to improve synchronous performance between the two torque modules 1 and to improve the stability of rotation of the rotating shaft assembly 2.

Referring again to FIGS. 11-FIG. 12, in the embodiments, the rotating assembly 14 further includes a bracket 144 sleeved on the rotating shaft 11 and disposed on a side of the transmission portion 19 back from the sliding assembly 15, and the rotating shaft assembly 2 further includes a synchronization shaft 192 and a wear-resistant member 193. The synchronization shaft 192 extends through the synchronization assembly 191 and is connected to the bracket 144, and the wear-resistant member 193 is fixed to a side of the synchronization assembly 191 back from the bracket 144.

The rotating shaft assembly 2 provided in the embodiments further includes the wear-resistant member 193, where the wear-resistant member 193 is wear-resistant and can be configured to avoid two components rubbing against each other or to withstand the friction between the two components moving against each other in order to protect the components. Moreover, since the wear-resistant member 193 is fixed to a side of the synchronization assembly 191, the wear-resistant member 193 may further be configured to limit an axial movement of the synchronization assembly 191 relative to the synchronization shaft 192. The present disclosure does not limit the shape and number of the wear-resistant members 193. In some embodiments, the fixing means by which the wear-resistant member 193 is fixed to the side of the synchronization assembly 191 back from the bracket 144 include, but are not limited to, an adhesive bonding, a snap connection, a fixed connection, etc. In some embodiments, the synchronization shaft 192 defines a holding slot on a peripheral side of the synchronization assembly 191 back from the bracket 144, and at least a portion of the wear-resistant member 193 is arranged in the holding slot.

In summary, the wear-resistant member 193 in the present embodiments may prevent the synchronization assembly and other components in the rotating shaft assembly 2 from rubbing against each other, such as the sliding assembly 15, thereby prevent the synchronization assembly 191 from jamming. In addition, the wear-resistant member 193 may limit the axial sliding of the synchronization assembly 191 relative to the synchronization shaft 192, which further improves the stability performance of the rotating shaft assembly 2 and increases the service life of the rotating shaft assembly 2.

Figure 13:
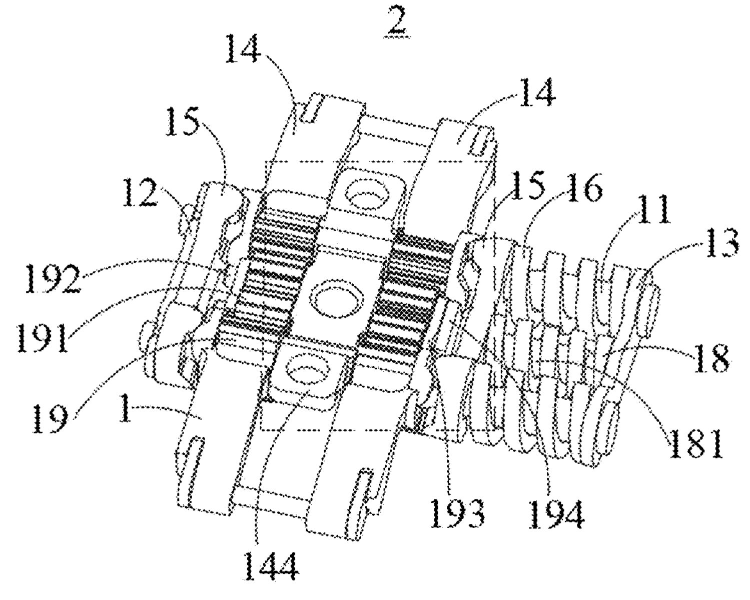
FIG. 13 is a perspective structural schematic view of a rotating shaft assembly according to further other embodiments of the present disclosure.
Figure 14:
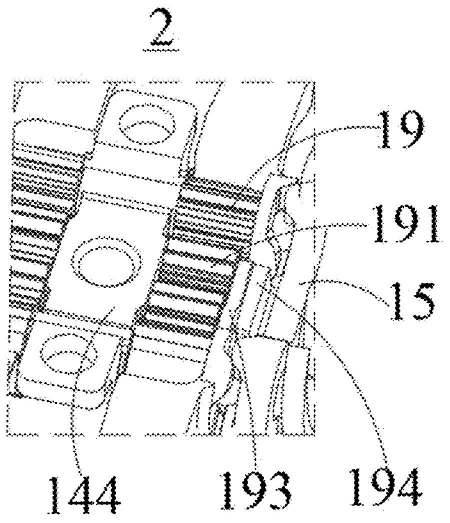
FIG. 14 is a partially enlarged view of FIG. 13.

Referring together to FIGS. 13-FIG. 14, FIG. 13 is a perspective structural schematic view of a rotating shaft assembly according to further other embodiments of the present disclosure, and FIG. 14 is a partially enlarged view of FIG. 13. In the embodiments, the rotating shaft assembly 2 further includes a third blocking member 194 disposed on a side of the wear-resistant member 193 back from the synchronization assembly 191.

The third blocking member 194 is configured to block or isolate components from contacting each other. The present embodiments do not limit the shape of the third blocking member. In some embodiments, the third blocking member 194 may be a raised portion of a component or may be a separate component. As shown in FIG. 14, the third blocking member 194 is arranged on the side of the wear-resistant member 193 back from the synchronization assembly 191, which may further avoid the synchronization assembly 191 from jamming due to debris generated by the friction between the wear-resistant member 193 and another component, for example, the sliding assembly 15, thereby further improving the stability performance of the movement of the rotating shaft assembly 2.

In some embodiments, the sliding assembly 15, the rotating assembly 14, the first elastic member 16, and the second elastic member 18 may be fit with a gap therebetween.

In some embodiments, the rotation centers of the first elastic member 16, the mating portion in the rotating assembly 14, the connecting member 143, the mating portion in the sliding assembly 15, and the friction member 17 overlap in the axial direction of the rotating shaft 11. It can be understood that the centers of movements of these components coincide to improve the stability performance of the operation of the rotating shaft assembly 2. In addition, a gap exists between the rotation centers of the connecting member 143 and the synchronization assembly 191, and the connecting member 143 and the synchronization assembly 191 perform a rotational movement around their respective rotation centers, i.e., centers of movements. The rotation center refers to the center of a circle in which a rotatable component performs a circular motion.

In some embodiments, the rotating shaft assembly 2 may rotate synchronously through the cooperation of the connecting member 143 with the synchronization assembly 191. For example, when the first rotating member 141 in one rotating assembly 14 rotates, the second rotating member 142 in this rotating assembly 14 is synchronously rotated through the connecting member 143, and the torque modules 1 on the other side are synchronously rotated through the two gears 19 in cooperation with the synchronization assembly 191 in a direction relatively towards or away from each other. Moreover, Hovering of the rotating shaft assembly 2 may be accomplished by mutual cooperations of the multiple mating portions, the first elastic member 16, the second elastic member 18, and the friction surface 145 at the abutting position between the rotating assembly 14 and the bracket 144.

In some embodiments, the rotating shaft assembly 2 may be front-mounted or reverse-mounted in order to realize matching with different components to achieve different spatial structure collocation. The rotating shaft assembly 2 provides the same torque, i.e. the same moment, regardless of whether forward or reverse mounting is applied.

In some embodiments, in production, the torque module 1 may be used as an independent torque assembly for production, assembly, maintenance and the like. The components may be fit with each other with a gap therebetween, so as to facilitate the assembly of the torque module 1 and the rotating shaft assembly 2, thereby improving the assembly efficiency, facilitating the disassembly, and reducing the maintenance cost.

Figure 15:
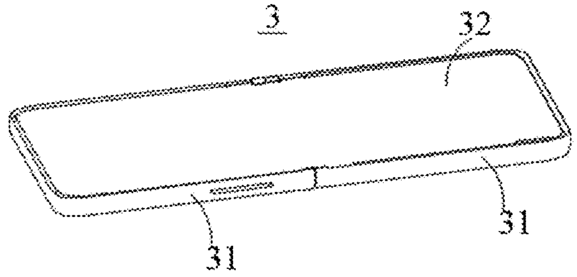
FIG. 15 is a perspective structural schematic view of a rotating shaft assembly according to still other embodiments of the present disclosure.
Figure 16:
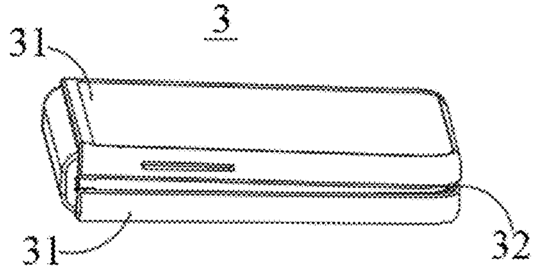
FIG. 16 is a perspective structural schematic view of a rotating shaft assembly according to still other embodiments of the present disclosure.
Figure 17:
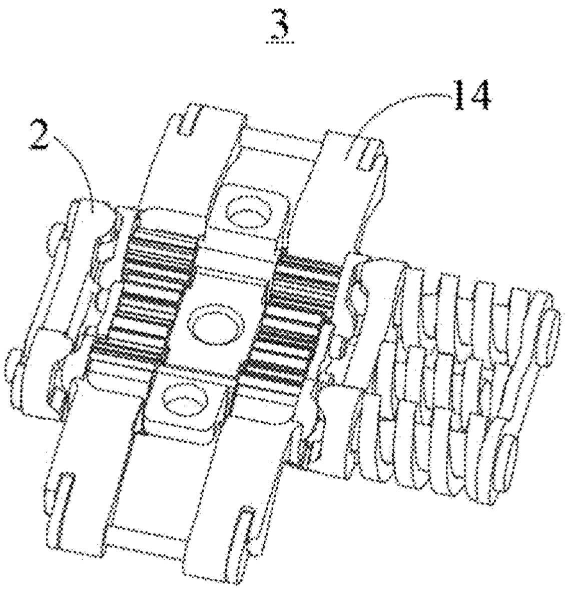
FIG. 17 is a perspective structural schematic view of a rotating shaft assembly of an electronic device in an unfolded state according to still other embodiments of the present disclosure.
Figure 18:
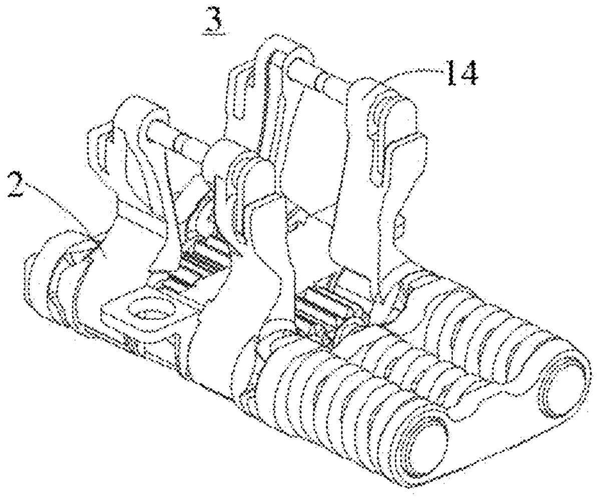
FIG. 18 is a perspective structural schematic view of a rotating shaft assembly of an electronic device in a folded state according to still other embodiments of the present disclosure.

Referring together to FIGS. 15-FIG. 18, FIG. 15 is a perspective structural schematic view of a rotating shaft assembly according to still other embodiments of the present disclosure, FIG. 16 is a perspective structural schematic view of a rotating shaft assembly according to still other embodiments of the present disclosure, FIG. 17 is a perspective structural schematic view of a rotating shaft assembly of an electronic device in an unfolded state according to still other embodiments of the present disclosure, and FIG. 18 is a perspective structural schematic view of a rotating shaft assembly of an electronic device in a folded state according to still other embodiments of the present disclosure.

The present disclosure further provides an electronic device 3 including two housings 31, a flexible screen 32, and the rotating shaft assembly 2 provided in the present disclosure. At least a portion of one of the two housings 31 is disposed on an end of the rotating shaft assembly 2, and at least a portion of the other of the two housings 31 is disposed on the other end of the rotating shaft assembly 2. The housing 31 is connected to the rotating assembly 14 in the rotating shaft assembly 2. The flexible screen 32 is disposed on a side of the housings 31 and the rotating assembly 14.

The electronic device 3 provided in the embodiments further includes the housings 31, which are typically configured to secure, support, or protect other components of the electronic device 3, and further to improve cosmetic properties. The material of the housing 31 includes, but is not limited to, plastic, metal, etc. The housing 31 may be a component of any shape, which is not limited herein, as long as each housing 31 is at least partially disposed on a corresponding side of the rotating shaft assembly 2, and the housing 31 is connected to the rotating assembly 14. In some embodiments, the connection method between the housing 31 and the rotating assembly 14 includes, but is not limited to, a threaded connection, a snap connection, etc. In addition, since the housing 31 is connected to the rotating assembly 14, and each housing 31 is at least partially disposed on a corresponding side of the rotating shaft assembly 2, when the two rotating assemblies 14 rotate in a direction relatively towards or away from each other, the two rotating assemblies 14 can drive the two housings 31 to rotate synchronously. The housing 31 may be connected either directly to the rotating assemblies 14 or indirectly through another component, such as a transmission member, etc., as long as the housing 31 can be driven to rotate synchronously when the rotating assemblies 14 rotate.

The electronic device 3 provided in the embodiments further includes the flexible screen 32, which is typically configured to display information such as images, text, etc. Since the flexible screen 32 itself is flexible, under the action of an external force, the flexible screen 32 may undergo a bending deformation, and may further resume deformation, i.e., return to a state before being subjected to the external force. The flexible screen 32 may be a component of any shape, which is not limited herein, as long as the flexible screen 32 is arranged on a side of the housing 31 and the rotating assembly 14.

Since the flexible screen 32 is arranged on the housing 31 and the rotating assembly 14, when the two rotating assemblies 14 and the two housings 31 rotate, the rotating assembly 14 and the housing 31 can drive the flexible screen 32 to undergo deformation. When the two rotating assemblies 14 and the two housings 31 are stationary, since the rotating shaft assembly 2 has the function of hovering and self-tightening, the flexible screen 32 is also stationary. Therefore, the electronic device 3 has an unfolded state and a folded state. As shown in FIG. 15, the unfolded state means that the flexible screen 32 is horizontally unfolded by 180°, i.e., the flexible screen 32 is not bent. As shown in FIG. 16, the folded state means that the flexible screen 32 is bent and at least a portion of the flexible screen 32 has a gap. The rotating shaft assembly 2 has been described in detail above, and the present disclosure will not repeat it herein. It is to be noted that when one or more rotating shaft assemblies 2 are applied in the electronic device 3, all of them can realize the rotation and hovering of other components driven by the rotating shaft assemblies 2.

As shown in FIG. 15, by arranging the rotating shaft assembly 2 provided in the present disclosure, the electronic device 3 can provide pressure and thus friction through the first elastic member 16. Therefore, compared to the related art, the hovering and self-tightening effect may be improved; further, the size of the rotating shaft assembly 2 of the present embodiments is further reduced when a same size of friction force is required to be provided to realize the hovering, thereby further improving the compactness of the structure of the rotating shaft assembly 2, which reduces the internal space, occupied by the rotating shaft assembly 2, of the electronic device 3, thus leaving more internal space for other components. In addition, the working performance of the electronic device 3 is improved, and the weight of the electronic device 3 is reduced, such that the production cost is reduced, improving the competitiveness of the entire electronic device 3. Moreover, since the rotating shaft assembly 2 may have a smaller size, the gap between the two torque modules 1 in the rotating shaft assembly 2 is smaller. It can be understood that by adopting a smaller size of the torque modules 1, the bending radius of the rotating shaft assembly 2 can be reduced, i.e., the bending radius of the electronic device 3 can be reduced, so as to make the gap between the flexible screens 32 smaller after bending. Therefore, when the electronic device 3 is in the folded state, the gap between the opposing sides of the flexible screens 32 is smaller, such that the appearance performance of the electronic device 3 may be improved.

In some embodiments, in actual production, when the rotating shaft assembly 2 is applied in conjunction with the flexible screen 32, the gap may be eliminated when the device is in the folded state and the appearance performance may be enhanced. For example, the rotating shaft assembly 2 and the flexible screen 32 may be combined through a medium plate structure and/or a slant plate structure by a drop hinge. In addition, various parameters in the electronic device 3 may affect the user's sense of use and the overall performance of the electronic device 3, such as the flatness of the screen support plate, the balance of the overall torsion, the wobbling experience of the middle frame, and the gap between the middle frame and the rotating shaft 11. The rotating shaft assembly 2 in the present embodiments may improve the torque performance of the whole machine, and thus improve the performance of the electronic device 3.

The above is the description of the embodiments in the present disclosure. The principles and implementation of the present disclosure are described and illustrated herein, and the above description is only intended to help understand the technical solutions of the present disclosure and its core ideas. For those skilled in the art, based on the ideas of the present disclosure, changes in the specific implementations and the application scope may be made. In view of the above, the contents of this specification should not be construed as a limitation of the present disclosure.

What is claimed is:

1. A torque module for an electronic device, comprising:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, comprising a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein during a transition process of an unfolded state and a folded state of the electronic device, the rotating assembly is caused to perform a rotation, the rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating;

wherein the rotating shaft comprises a first portion and a second portion connected to the first portion; the first portion penetrates the first blocking member, the sliding assembly, the rotating assembly, and at least a portion of the first elastic member; the second portion penetrates the second blocking member and at least a portion of the first elastic member; the sliding assembly defines a first through hole through which the first portion passes, and the rotating assembly defines a second through hole through which the first portion passes; a radial dimension of each of the first through hole and the second through hole is smaller than a radial dimension of the second portion.

2. The torque module as claimed in claim 1, wherein a portion of the rotating assembly sleeved on the rotating shaft is arranged with a third mating portion on a side near the second blocking member;

the sliding assembly further comprises a second sliding member sleeved on the rotating shaft and disposed on a side of the rotating assembly near the second blocking member, and a portion of the second sliding member sleeved on the rotating shaft is arranged with a fourth mating portion on a side near the third mating portion;

the rotation of the rotating assembly further enables the third mating portion and the fourth mating portion to cooperate with each other, and the sliding assembly is caused to slide in the direction close to or away from the rotating assembly; in condition of the sliding assembly sliding in the direction away from the rotating assembly, the first elastic member is in the compressed state and the third mating portion and the fourth mating portion abut against each other, and the rotating assembly is caused to remain stationary relative to the sliding assembly in condition of the rotating assembly stopping rotating.

3. The torque module as claimed in claim 2, wherein the first mating portion comprises a plurality of first protrusions spaced apart, the second mating portion comprises a plurality of second protrusions spaced apart, the third mating portion comprises a plurality of third protrusions spaced apart, and the fourth mating portion comprises a plurality of fourth protrusions spaced apart; each of the plurality of first protrusions, the plurality of second protrusions, the plurality of third protrusions, and the plurality of fourth protrusions has a crest; the crests of the plurality of first protrusions are disposed symmetrically with the crests of the plurality of third protrusions, and the crests of the plurality of second protrusions are disposed symmetrically with the crests of the plurality of fourth protrusions;

in condition of the sliding assembly sliding in the direction away from the rotating assembly, and the crests of the plurality of first protrusions being in contact with the crests of the plurality of second protrusions and the crests of the plurality of third protrusions being in contact with the crests of the plurality of fourth protrusions, the first elastic member is in the compressed state, and the sliding assembly is caused to abut against the rotating assembly.

4. The torque module as claimed in claim 2, wherein the rotating assembly comprises:

a first rotating member, sleeved on the rotating shaft and disposed on a side near the first sliding member; wherein a side of the first rotating member near the first sliding member is arranged with the first mating portion;

a second rotating member, sleeved on the rotating shaft and disposed on a side near the second sliding member; wherein a side of the second rotating member near the second sliding member is arranged with the third mating portion;

a connecting member; wherein an end of the connecting member is connected to the first rotating member, and another end of the connecting member is connected to the second rotating member; and a bracket, sleeved on the rotating shaft and disposed between the first rotating member and the second rotating member.

5. The torque module as claimed in claim 4, wherein, an abutting position between the first rotating member in the rotating assembly and the bracket is arranged with a friction surface; and/or an abutting position between the second rotating member in the rotating assembly and the bracket is arranged with a friction surface.

6. The torque module as claimed in claim 4, wherein the first rotating member is sleeved on the end of the connecting member, and the second rotating member is sleeved on the other end of the connecting member; the torque module further comprises two limiting members, wherein an end of the connecting member is connected to one of the two limiting members, and the other end of the connecting member is connected to the other of the two limiting members; one of the two limiting members is fixed to an end of the first rotating member back from the second rotating member, and the other of the two limiting members is fixed to an end of the second rotating member back from the first rotating member.

7. The torque module as claimed in claim 6, wherein a side of each limiting member near the rotating assembly is arranged with a first snap portion, and a second snap portion is arranged on a side of the rotating assembly near the first snap portion, with at least a portion of the first snap portion being arranged within the second snap portion.

8. The torque module as claimed in claim 1, further comprising a friction member, fixed to the rotating shaft and disposed on a side of the second blocking member back from the rotating assembly; wherein the rotation of the rotating assembly enables the friction member to rotate relative to the second blocking member.

9. The torque module as claimed in claim 1, wherein the first elastic member has a pre-compressed state.

10. A rotating shaft assembly for an electronic device, comprising two torque modules that are disposed axially symmetrically; wherein for each of the two torque modules, the torque module comprises:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, comprising a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein during a transition process of an unfolded state and a folded state of the electronic device, the rotating assembly is caused to perform a rotation, the rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating;

the rotating assembly in one of the two torque modules extends in a direction away from the rotating assembly in the other of the two torque modules;

wherein the rotating shaft comprises a first portion and a second portion connected to the first portion; the first portion penetrates the first blocking member, the sliding assembly, the rotating assembly, and at least a portion of the first elastic member; the second portion penetrates the second blocking member and at least a portion of the first elastic member; the sliding assembly defines a first through hole through which the first portion passes, and the rotating assembly defines a second through hole through which the first portion passes; a radial dimension of each of the first through hole and the second through hole is smaller than a radial dimension of the second portion.

11. The rotating shaft assembly as claimed in claim 10, wherein the sliding assembly further comprises a second sliding member sleeved on the rotating shaft and disposed on a side of the rotating assembly near the second blocking member; the second sliding members in the two torque modules are connected to each other, and the second blocking members in the two torque modules are connected to each other; the rotating shaft assembly further comprises a second elastic member disposed between a connection of the second sliding members and a connection of the second blocking members.

12. The rotating shaft assembly as claimed in claim 11, wherein the second elastic member has a pre-compressed state.

13. The rotating shaft assembly as claimed in claim 11, wherein the torque module further comprises a positioning member disposed between the second sliding members and the second blocking members, and the positioning member is connected to the connection of the second sliding members or the connection of the second blocking members; the second elastic member is sleeved on the positioning member; a first end of the second elastic member is in contact with the connection of the second sliding members, and a second end of the second elastic member is in contact with the connection of the second blocking members, the first end being opposite to the second end.

14. The rotating shaft assembly as claimed in claim 10, wherein the first sliding members in the two torque modules are connected to each other, and the first blocking members in the two torque modules are connected to each other.

15. The rotating shaft assembly as claimed in claim 10, wherein a peripheral side of the portion of the rotating assembly sleeved on the rotating shaft is further arranged with a transmission portion, and the rotating assembly further comprises a synchronization assembly; an end of the synchronization assembly is rotatably connected to the transmission portion, and another end of the synchronization assembly is rotatably connected to the transmission portion of the other of the two torque modules; the two torque modules are capable of moving synchronously.

16. The rotating shaft assembly as claimed in claim 15, wherein the rotating assembly further comprises a bracket sleeved on the rotating shaft and disposed on a side of the transmission portion back from the sliding assembly, and the rotating shaft assembly further comprises a synchronization shaft and a wear-resistant member; the synchronization shaft extends through the synchronization assembly and is connected to the bracket, and the wear-resistant member is fixed to a side of the synchronization assembly back from the bracket.

17. The rotating shaft assembly as claimed in claim 16, further comprising a third blocking member disposed on a side of the wear-resistant member back from the synchronization assembly.

18. An electronic device, comprising two housings, a flexible screen, and a rotating shaft assembly; wherein one of the two housings is at least partially disposed on an end of the rotating shaft assembly, and the other of the two housings is at least partially disposed on another end of the rotating shaft assembly;

wherein the rotating shaft assembly comprises two torque modules that are disposed axially symmetrically; for each of the two torque modules, the torque module comprises:

a rotating shaft;

a first blocking member, fixed to the rotating shaft;

a second blocking member, fixed to the rotating shaft;

a rotating assembly, sleeved on the rotating shaft and disposed between the first blocking member and the second blocking member; wherein a portion of the rotating assembly sleeved on the rotating shaft is arranged with a first mating portion on a side near the first blocking member;

a sliding assembly, comprising a first sliding member sleeved on the rotating shaft and disposed on the side of the rotating assembly near the first blocking member; wherein a portion of the first sliding member sleeved on the rotating shaft is arranged with a second mating portion on a side near the first mating portion; and a first elastic member, sleeved on the rotating shaft and disposed between the rotating assembly and the second blocking member;

wherein during a transition process of an unfolded state and a folded state of the electronic device, the rotating assembly is caused to perform a rotation, the rotation of the rotating assembly enables the first mating portion and the second mating portion to cooperate with each other, and the sliding assembly is caused to slide in a direction close to or away from the rotating assembly; in condition of the sliding assembly sliding in the direction away from the rotating assembly, the first elastic member is in a compressed state and the first mating portion and the second mating portion abut against each other, and the rotating assembly is caused to remain stationary relative to the sliding assembly in condition of the rotating assembly stopping rotating;

the rotating assembly in one of the two torque modules extends in a direction away from the rotating assembly in the other of the two torque modules;

the two housings are connected to the rotating assemblies in the rotating shaft assembly;

the flexible screen is disposed on a side of the two housings and the rotating assemblies;

wherein the rotating shaft comprises a first portion and a second portion connected to the first portion; the first portion penetrates the first blocking member, the sliding assembly, the rotating assembly, and at least a portion of the first elastic member; the second portion penetrates the second blocking member and at least a portion of the first elastic member; the sliding assembly defines a first through hole through which the first portion passes, and the rotating assembly defines a second through hole through which the first portion passes; a radial dimension of each of the first through hole and the second through hole is smaller than a radial dimension of the second portion.

* * * * *